(12) United States Patent
Geyer et al.

(10) Patent No.: US 12,119,737 B2
(45) Date of Patent: Oct. 15, 2024

(54) MODEL PREDICTIVE PULSE PATTERN CONTROL BASED ON OPTIMIZING A SEQUENCE OF AVERAGED SWITCH POSITIONS

(71) Applicant: ABB Schweiz AG, Baden (CH)

(72) Inventors: Tobias Geyer, Ennetbaden (CH); Annika Birth, Wettingen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/767,793

(22) PCT Filed: Sep. 29, 2020

(86) PCT No.: PCT/EP2020/077254
§ 371 (c)(1),
(2) Date: Apr. 8, 2022

(87) PCT Pub. No.: WO2021/069261
PCT Pub. Date: Apr. 15, 2021

(65) Prior Publication Data
US 2024/0097553 A1  Mar. 21, 2024

(30) Foreign Application Priority Data

Oct. 11, 2019 (EP) ...................... 19202733

(51) Int. Cl.
*H02M 1/00* (2007.01)
*H02M 7/483* (2007.01)
*H02M 7/525* (2006.01)

(52) U.S. Cl.
CPC ......... *H02M 1/0012* (2021.05); *H02M 7/483* (2013.01); *H02M 1/0025* (2021.05); *H02M 7/525* (2013.01)

(58) Field of Classification Search
CPC .. H02M 1/0012; H02M 1/0025; H02M 7/483; H02M 7/525
See application file for complete search history.

(56) References Cited

U.S. PATENT DOCUMENTS

2018/0054112 A1  2/2018  Al-Hokayem et al.
2018/0131266 A1* 5/2018  Rohr ................. H02M 1/12
(Continued)

FOREIGN PATENT DOCUMENTS

EP  2469692 A1  6/2012
EP  3058646 A1  8/2016
(Continued)

OTHER PUBLICATIONS

Remarks filed Oct. 13, 2021 in response to EPO search report and opinion in foreign priority application EP 19202733. Obtained via Global Dossier (https://globaldossier.uspto.gov) on Jan. 13, 2024. (Year: 2021).*

(Continued)

*Primary Examiner* — Fred E Finch, III
(74) *Attorney, Agent, or Firm* — McCarter & English, LLP

(57) ABSTRACT

A method for controlling an electrical converter system is provided herein. The method includes determining a switching signal and a reference trajectory of at least one electrical quantity of the electrical converter system over a horizon of future sampling instants; generating a sequence of averaged switch positions from the switching signal over the horizon; determining a sequence of optimized averaged switch positions with optimized averaged switch positions by optimizing a cost function based on the sequence of averaged switch positions; determining an optimized switching signal for the current sampling interval by moving switching transitions in the switching signal, such that the average of the switching signal with the modified switching transitions equals the (Continued)

optimized averaged switch position; and applying at least the next switching transition of the optimized switching signal for the current sampling interval to the electrical converter system.

14 Claims, 10 Drawing Sheets

(56) References Cited

U.S. PATENT DOCUMENTS

| | | | |
|---|---|---|---|
| 2018/0145579 A1* | 5/2018 | Spudic | H02M 7/4835 |
| 2019/0181775 A1* | 6/2019 | Geyer | H02M 1/126 |
| 2020/0350847 A1* | 11/2020 | Geyer | H02P 21/30 |
| 2020/0409320 A1* | 12/2020 | El Shormbably | H02P 23/0077 |

FOREIGN PATENT DOCUMENTS

| | | |
|---|---|---|
| EP | 3262741 A1 | 1/2018 |
| EP | 3496261 A1 | 6/2019 |
| EP | 3501091 B1 | 4/2020 |
| EP | 3806311 A1 | 4/2021 |
| EP | 3529888 B1 | 5/2021 |
| WO | 2016134874 A1 | 9/2016 |
| WO | 2018033214 A1 | 2/2018 |

OTHER PUBLICATIONS

B. P. McGrath, S. G. Parker, and D. G. Holmes, "High-performance current regulation for low-pulse-ratio inverters," EEE Trans. Ind. Appl., vol. 49, pp. 149-158, Jan./Feb. 2013.

H. du Toit Mouton and T. Geyer, "Trajectory-based LQR control of a grid-connected converter with an LCL filter," in Proc. IFAC Conf. on Nonlin. Model Predictive Control, (Madison, WI, USA), Aug. 2018.

T. Laczynski, T. Werner, and A. Mertens, "Energy-based modulation error control for high-power drives with output LC-filters and synchronous optimal pulse width modulation," in Proc. IEEE Power Electron. and Motion Control Conf., pp. 649-656, Sep. 2008.

T. Laczynski, T. Werner, and A. Mertens, "Active damping of LC-filters for high power drives using synchronous optimal pulsewidth modulation," in Proc. IEEE Power Electron. Spec. Conf., pp. 1033-1040, Jun. 2008.

S. Mariethoz and M. Morari, "Explicit model predictive control of a PWM inverter with an LCL filter," IEEE Trans. Ind. Electron., vol. 56, pp. 389-399, Feb. 2009.

I. Pejcic, S. Almer, and H. Peyrl, "Voltage source converter MPC with optimized pulse patterns and minimization of Integrated squared tracking error," in Proc. Am. Control Conf., (Seattle, WA, USA), May 2017.

S. Almér, "Predictive pulse pattern control of an inverter with LCL filter: A nonlinear transfor-mation approach," in Proc. IEEE Energy Convers. Congr. Expo., (Kaohsiung, Taiwan), 2017.

R. P. Aguilera, P. Acuña, P. Lezana, G. Konstantinou, B. Wu, S. Bernet, and V. G. Agelidis, "Selective harmonic elimination model predictive control for multilevel power converters," IEEE Trans. Power Electron., vol. 32, pp. 2416-2426, Mar. 2017.

T. Geyer, N. Oikonomou, G. Papafotiou, and F. Kieferndorf. Model predictive pulse pattern control. IEEE Trans. Ind. Appl., 48(2):663-676, Mar./Apr. 2012.

J. B. Rawlings and D. Q. Mayne. Model predictive control: Theory and design. Nob Hill Publ., Madison, WI, USA, 2009.

H. S. Patel and R. G. Hoft. Generalized techniques of harmonic elimination and voltage con-trol in thyristor inverters: Part I—Harmonic elimination. IEEE Trans. Ind. Appl., IA-9(3):310-317, May/Jun. 1973.

G. S. Buja. Optimum output waveforms in PWM inverters. IEEE Trans. Ind. Appl., 16(6):830-836, Nov./Dec. 1980.

T. Geyer, N. Oikonomou, G. Papafotiou, and F. Kieferndorf. Model predictive pulse pattern control. In Proc. IEEE Energy Convers. Congr. Expo., pp. 3306-3313, Phoenix, AZ, USA, Sep. 2011.

J. Holtz and N. Oikonomou. Synchronous optimal pulsewidth modulation and stator flux tra- jectory control for medium- voltage drives. IEEE Trans. Ind. Appl., 43(2):600-608, Mar./Apr. 2007.

A. Birth, T. Geyer, and H. du Toit Mouton. Symmetry relaxation of three-level optimal pulse patterns for lower harmonic distortion. In Proc. Eur. Power Electron. Conf., Genova, Italy, Sep. 2019.

P. Al Hokayem, T. Geyer, and N. Oikonomou. Active damping for model predictive pulse pattern control. In Proc. IEEE Energy Convers. Congr. Expo., pp. 1220-1227, Pittsburgh, PA, USA, Sep. 2014.

I. Pejcic. Spectral predictive control in power electronics. Master's thesis, EPFL, Automatic Control Laboratory, Aug. 2014.

T. Geyer. Model predictive control of high power converters and industrial drives. Wiley, London, UK, Oct. 2016.

Quevedo et al: "Model Predictive Control for Power Electronics Applications" In: "Handbook of Model Predictive Control", Nov. 30, 2018 (Nov. 30, 2018), Springer International Publishing, pp. 551-580.

Liuping Wang et al: "PID and Predictive Control of Electrical Drives and Power Converters Using Matlab /Simulink" In: "PID and Predictive Control of Electrical Drives and Power Converters Using Matlab /Simulink", Dec. 31, 2015 (Dec. 31, 2015), https://ieeexpiore.ieee.org/book/7111423, XP055741372, ISBN: 978-1-118-33944-2 pp. 265¬313, p. 287.

International Search Report and Written Opinion for Corresponding International Application No. PCT/EP2020/077254, mailed Nov. 4, 2020, 16 pages.

Tomlinson, Males, Toit Mouton, and Ralph Kennel. "Finite-control-set model predictive control with a fixed switching. Frequency vs. linear control for current control of a single-leg inverter." 2015 IEEE International Symposium on Predictive Control of Electrical Drives and Power Electronics (PRECEDE). IEEE, 2015.

\* cited by examiner

US 12,119,737 B2

MODEL PREDICTIVE PULSE PATTERN CONTROL BASED ON OPTIMIZING A SEQUENCE OF AVERAGED SWITCH POSITIONS

CROSS-REFERENCE TO RELATED APPLICATIONS

The present application is a National Stage Entry of International Application No. PCT/EP2020/077254, filed on Sep. 29, 2020, which claims the benefit of priority to European Patent Application No. 19202733.2, filed on Oct. 11, 2019, the entire contents of which are incorporated by reference in their entirety herein.

FIELD OF THE DISCLOSURE

The disclosure relates to the field of control of electrical converters. In particular, the disclosure relates to a method, a computer program, a computer-readable medium and a controller for controlling an electrical converter system. Additionally, the disclosure relates to an electrical converter system.

BACKGROUND OF THE DISCLOSURE

Some years ago, MP$^3$C (model predictive pulse pattern control) has been introduced to control electrical converters. With MP$^3$C offline optimized pulse patterns may be modified online to control them in a closed loop to even better reach control objectives.

For example, EP 2 469 692 A1 describes such a method, in which switching instants generated from optimized pulse patterns are modified (or moved) to reduce a flux error.

The concept of MP$^3$C is usually limited to control systems whose dynamics can be described by first-order differential equations. For example, when controlling the virtual converter flux vector of a grid-connected converter or when controlling the stator flux vector of an electrical machine, first-order dynamical systems arises.

When adding an LC filter to the converter system, a third-order system may arise, since the LC filter adds two more state variables in each axis of an orthogonal coordinate system.

In the presence of LC filters a standard MP$^3$C may be adopted and virtual filter quantities may be controlled, rather than grid or machine quantities. Specifically, the virtual converter flux vector may be controlled. By doing so, a current through the LC filter's inductor may be controlled, rather than a grid current or a stator current of a machine. As a result, the system, which is to be controlled is of first order and standard MP$^3$C may be used.

However, the closed-loop behaviour of such a type of control may be slow. Even more importantly, poorly damped resonance peaks in the circuit may lead to oscillations in the LC filter and/or when a long cable is present. Without passive damping, active damping methods may be required to avoid large oscillations. These may require the addition of an active damping control loop.

WO 2016/134874 A1 relates to time shifting of switching instants of an optimized pulse pattern. The time shifting is done with model predictive control, in which an objective function based on a flux error is minimized.

EP 3 496 261 A1 mention that the switching signal may be averaged for concealing the switching nature of the power converter. Such a statement is also made in by Quevedo et al: "Model Predictive Control for Power Electronics Applications" In: "Handbook of Model Predictive Control", 30 Nov. 2018 (2018 Nov. 30), Springer International Publishing, pages 551-580.

DESCRIPTION OF THE DISCLOSURE

A controller for an electrical converter system based on optimized pulse pattern is provided, which also has a good performance during transient operations and/or which can be used for converter systems being higher order physical systems.

The features of the controller are achieved by the subject-matter of the disclosure, and further example embodiments are also described herein.

An aspect of the disclosure relates to a method for controlling an electrical converter system. In particular, the method may be applied to a converter system including an electrical converter and a further component supplied by the converter, such as an electrical machine, a grid, a resonant subsystem and/or a cable with high impedance. The resonant subsystem may be a filter, such as an LC or LCL filter. As already mentioned, LC filters may result in a mathematical model of higher order, which may be solved with the present method. The method may be automatically performed by a controller of the converter system.

According to an embodiment of the disclosure, the method includes: determining a switching signal and a reference trajectory of at least one electrical quantity of the electrical converter system over a horizon of future sampling instants, wherein the switching signal and the reference trajectory are determined from a table of optimized pulse patterns, the switching signal includes and/or defines switching transitions between output levels of an electrical converter of the electrical converter system and the reference trajectory indicates a desired future trajectory of the at least one electrical quantity and/or desired future developments of electrical quantities of the converter system.

A switching signal may include switching instants and switch positions at the switching instants. The switching signal and all quantities mentioned below may be multi-phase quantities, i.e. may have values for every phase of the converter system. A switch position may be an output level of an electrical converter.

A switching instant may be a time, at which the converter semiconductor switches are switched. A sampling instant may be a time, at which measurements and/or estimates are obtained and for which future quantities in the controller are calculated. For example, sampling instants may be equidistant with respect to each other. A switching instant may be situated between two sampling instants.

The switching signal may be determined by the controller online from a lookup table of offline computed optimized pulse patterns, which may have been determined with respect to an optimization goal for steady state operation.

Furthermore, for one electrical quantity or multiple electrical quantities of the converter system, a reference trajectory may be determined. The electrical quantities may include a converter current, a grid current, a filter capacitor voltage, a stator current, a stator flux, etc. In general, an electrical quantity may be a current, voltage and/or flux of a component of the converter system.

This may be done by predicting the quantities from actual values, which may have been determined from measurements, into the future. The prediction may be done with a mathematical model of the converter, which may include differential equations for the quantities. It also may be that the reference trajectories already have been determined offline for the optimized pulse patterns and are read from a lookup table.

According to an embodiment of the disclosure, the method further includes: generating a sequence of nominal (discrete-time) averaged switch positions from the nominal (continuous-time) switching signal over the horizon, wherein the switching signal is divided into sampling intervals, and the averaged switch positions are determined by averaging the switching signal in the sampling interval defined by the time instants and switch positions in the sampling interval. The sequence of nominal averaged switch positions, which may be determined for each phase of the converter system, may be interpreted as a step function, which changes solely at sampling instants. A sampling interval may be the interval between two consecutive sampling instants. The averaging may be done such that in a sampling interval, the averaged switch position is the exact representation of the averaged switching signal in that sampling interval.

Due to the usage of the averaged switch position, in the following steps of the method, predicted future values solely may be determined for the sampling instants (and not additionally for the switching instants). This may simplify the problem and/or the calculations for the controller significantly.

According to an embodiment of the disclosure, the method includes: determining a sequence of optimized averaged switch positions by optimizing a cost function based on the sequence of averaged switch positions, which cost function includes an error term with a difference of the reference trajectory and the predicted trajectory, both being trajectories of at least one output quantity, wherein the predicted trajectory is determined over the horizon from a model of the converter system, into which a sequence of modified averaged switch positions and measurements of the converter system are input.

The model, which may be considered a mathematical and/or physical model of the converter system, may model differential equations of quantities of the converter system, such as a converter current, a capacitor voltage, a grid current, a machine current, a machine flux, etc. The differential equations may be processed in the form of difference equations adapted to the sampling instants. In general, the quantities may include currents, voltages and/or fluxes of components of the converter system.

All these quantities may be considered trajectories over time. For each quantity, sequences of values at sampling instants, i.e. trajectories, may be determined. The optimization of the sequence of averaged switch positions takes place with a cost (or objective) function, into which the reference trajectories and predicted trajectories are input and which cost function is optimal (minimal or maximal), when the predicted closed-loop performance becomes optimal.

It may be that the prediction and/or optimization takes place with respect to constraints, such as minimal and maximal voltages, currents and/or fluxes for specific components of the converter, such as a capacitor voltage, a magnitude of a current and/or an output voltage of the converter, etc.

The optimization may be performed with a quadratic program, which is implemented in the controller. In this case, the controller solves equations of matrices, which have been filled before based on measurements and/or estimates, the reference trajectories and/or the switching signals.

According to an embodiment of the disclosure, the method further includes: determining an optimized switching signal for a current sampling interval by moving switching transitions of the switching signal, such that in the current sampling interval the average of the switching signal with the modified switching transitions equals the optimized averaged switch position. From the optimized averaged switch positions, which have been optimized by optimizing the cost function, an optimized switching signal and/or at least an optimized switching signal up to the next sampling instant may be determined. This may be seen as the reverse operation of the operation described above, in which the averaged switch position is determined from the optimized pulse pattern.

According to an embodiment of the disclosure, the method further includes: applying the switching signal at least until the next sampling instant of the optimized switching signal to the electrical converter. It may be that a receding horizon policy is performed by the controller, i.e. that the sequence of optimized averaged switch positions over a horizon of more than one sampling instant and at least the optimized switching signal up to the next sampling instant are determined and that solely the optimized switching signal up to the next sampling instant is applied to the converter.

In summary, for converter systems with a physical behaviour of higher order, the method may manipulate the switching instants of pre-computed optimized pulse patterns in order to achieve the following:

The output variables may be regulated along their respective reference trajectories. These output variables may include the converter current, capacitor voltage and grid current for grid-connected converters with an LC filter. For converter systems with an electrical machine and an LC filter, the output quantities may be an electromagnetic torque, a stator flux magnitude, a stator flux vector, a rotor flux and/or a speed of the electrical machine, as well as an inductor current and/or a capacitor voltage of the LC filter.

During steady-state operation the superior harmonic performance of optimized pulse patterns may be achieved. Disturbances, such as a dc-link voltage ripple, may be fully rejected thanks to the high bandwidth of the controller.

During transients, disturbances and/or faults, a fast response may be achieved. One example for this may be a superior low voltage ride-through capability.

Electrical resonances in the converter system may not to be excited and/or any related oscillations may be actively damped.

The method may be insensitive to measurement and observer noise, and may be robust with respect to parameter uncertainties, such as unknown variations in the system parameters. Examples for this may include variations in inductors and/or capacitors of the converter system.

According to an embodiment of the disclosure, sampling intervals without switching transitions are discarded and the averaged switch positions are solely optimized in the sampling intervals including at least one switching transition. This may reduce the complexity of the system of difference equations to be solved. For example, the resulting quadratic program may be composed of matrices of lower size and dimension, without entries for the discarded sampling intervals. In the optimized switching signal, the switching instants and/or switching transitions in the discarded sampling intervals from the original switching signal may be inserted.

According to an embodiment of the disclosure, the sequence of optimized averaged switch positions is determined by solving a quadratic program into which the sequence of averaged switch positions, the reference trajectory and the system model are input. This may result in a cost function equation with a Hessian matrix, which is multiplied by two vectors of input variables. It may be that the Hessian matrix of the quadratic program is time-independent and may be precalculated, for example in the case, when all sampling intervals are considered in the optimization of the cost function.

According to an embodiment of the disclosure, the cost function additionally includes a term with a difference of the nominal averaged switch positions and the optimized averaged switch positions. This may result in the optimization goal that switching instants are modified as little as possible.

According to an embodiment of the disclosure, the optimized averaged switch positions are determined by optimizing the cost function subject to constraints. As already mentioned, these constraints may include constraints on voltages, currents and/or fluxes in the converter system, such that these voltages, currents and/or fluxes do not leave a bounding interval. A bounding interval may be defined by a constant minimum and/or a constant maximum.

According to an embodiment of the disclosure, the averaged switch positions of the sequence of averaged switch positions are constrained, such that the modified switching transitions stay in the respective sampling interval. This may be achieved by determining a minimal and maximal value of the averaged switch positions for each sampling interval. The minimal value may be the lowest switch position of the nominal switching signal in that sampling interval. Analogously, the maximum value may be the highest switch position of the nominal switching signal in that sampling interval.

According to an embodiment of the disclosure, the averaged switch positions of the sequence of averaged switch positions are constrained, such that the modified switching transitions stay in the original order. In this case, the switching transitions may be moved outside of their original sampling instants.

According to an embodiment of the disclosure, the modified switching transitions of the optimized switching signal are determined for each sampling interval by solving a linear program with a further cost function, which minimizes the differences between the nominal switching transitions and the respective modified switching transitions, and constrains the modification of the switching transitions to equal the modification of the averaged switch position in that sampling interval. The linear program may also constrain the modified switching transitions to stay in their respective sampling intervals and in the original order. In the case when several switching transitions may be present between two sampling instants, the modification of the switching transitions may be performed subject to the optimization goal that the switching instants are modified as little as possible. This optimization may be performed independently from the optimization of the error between the reference trajectory and the predicted trajectory and/or the averaged switch positions.

According to an embodiment of the disclosure, the reference trajectory has a converter contribution, which is determined from the optimized pulse patterns, and/or the reference trajectory has a grid contribution, which is determined from an estimated sinusoidal grid voltage. In the case when the converter is connected to an electrical grid, the reference trajectory may be the sum of the reference trajectory with the converter contribution and the reference trajectory with the contribution from the grid voltage. The influence of the converter and of the grid on the reference trajectories may be split up into contributions from the converter and contributions from the grid.

The reference trajectory of each respective quantity may be the sum of the converter contribution and the grid contribution of the respective quantity. The converter contribution may be determined from the optimized pulse pattern, for example offline, and/or may be stored in the lookup table. The grid contribution may be determined from measurements, and the grid voltage may be assumed to be a sinusoidal quantity.

According to an embodiment of the disclosure, the converter contribution to the reference trajectory is determined at support points which may have a different spacing as the controller sampling instants, and the values of the reference trajectory at the sampling instants are determined by interpolation. For example, the reference trajectory may have support points at the switching instants of the switching signal. A linear interpolation between these points may be performed.

According to an embodiment of the disclosure, the optimized pulse patterns and a converter contribution of the reference trajectory are determined offline and stored in a lookup table. An optimized pulse pattern may be determined for each modulation index and each pulse number, which are used in the converter system. The actual modulation index and pulse number may be determined from actual reference values and/or measurements in the converter system.

The optimized pulse patterns may have been calculated offline with respect to a specific optimization goal, such as a minimal total demand distortion of the current during steady state operation. The optimized pulse patterns may be stored in a lookup table in the controller.

One or more reference trajectories also may have been determined offline from the optimized pulse patterns. The values for these reference trajectories also may be stored in a lookup table in the controller. These reference trajectories solely may provide a converter contribution of the overall reference trajectories, to which a grid contribution may be added.

Further aspects of the disclosure relate to a computer program, which when executed by a processor is adapted for performing the method as described above and below and to a computer-readable medium, in which such a computer program is stored. The method may be implemented in software and may be run on a controller having a processor and a memory in which the computer program is stored.

A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer readable medium may also be a data communication network, e.g. the Internet, which allows downloading a program code. In general, the computer-readable medium may be a non-transitory or transitory medium.

A further aspect of the disclosure relates to a controller for an electrical converter adapted for performing the method as described above and below. It has to be noted that the method also may be at least partially implemented in hardware, for example in a DSP or FPGA.

A further aspect of the disclosure relates to a converter system, which includes an electrical converter connected to an electrical grid and a controller as described above and below.

According to an embodiment of the disclosure, the converter system further includes a resonant subsystem including at least one of an inductor, a capacitor, a filter and/or transformer. For example, the resonant subsystem may be an LC filter or a cable, which may have a high impedance. The model of the converter system used during the optimization of the cost function may include a model of the electrical converter and the resonant subsystem. In particular, the resonant subsystem may result in differential equations of higher order.

It has to be understood that features of the method as described in the above and in the following may be features of the converter system, computer program, the computer readable medium and the controller, as described in the above and in the following, and vice versa.

These and other aspects of the disclosure will be apparent from and elucidated with reference to the embodiments described hereinafter.

BRIEF DESCRIPTION OF THE DRAWINGS

The subject matter of the disclosure will be explained in more detail in the following text with reference to exemplary embodiments, which are illustrated in the attached drawings.

In principle, identical parts are provided with the same reference symbols in the figures.

DETAILED DESCRIPTION

Figure 1:
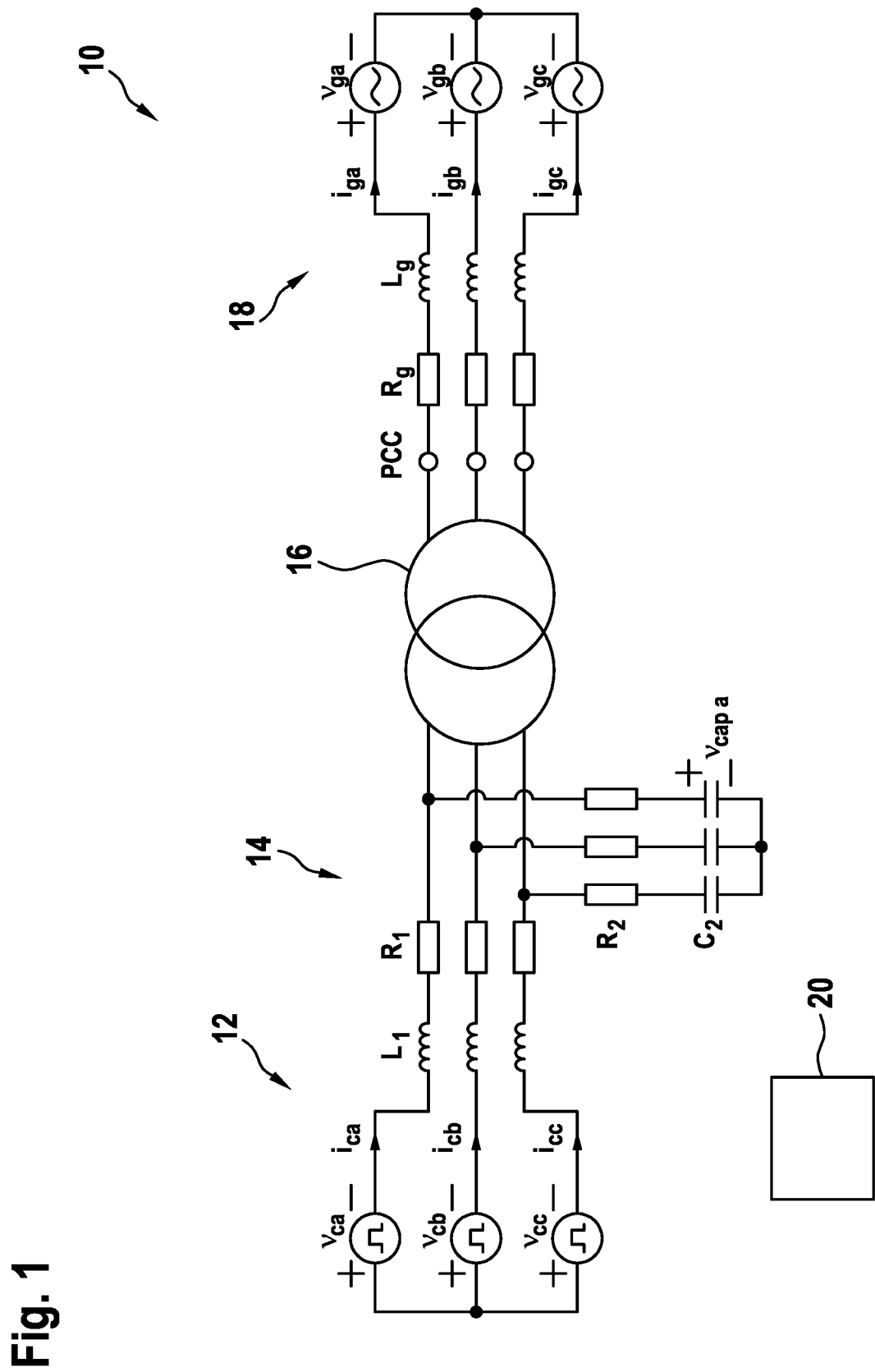
FIG. 1 schematically shows a converter system according to an embodiment of the disclosure.

FIG. 1 shows a converter system 10 including an electrical converter 12, an LC-filter 14, and a transformer 16, which are coupled via a point of common coupling PCC with an electrical grid 18. The converter 12 and the grid 18 are depicted with equivalent circuits. The respective quantities shown in FIG. 1 are listed in the end of the present description.

Furthermore, FIG. 1 shows a controller 20, which is adapted for performing the method for controlling the converter system 10, as described herein.

The LC-filter 14 may include filter inductors $L_1$ and filter resistors $R_2$ connected between the converter 12 and the transformer 16, and filter resistors $R_2$ and filter capacitors $C_2$ connected between the converter 12 and the transformer 16.

Figure 2:
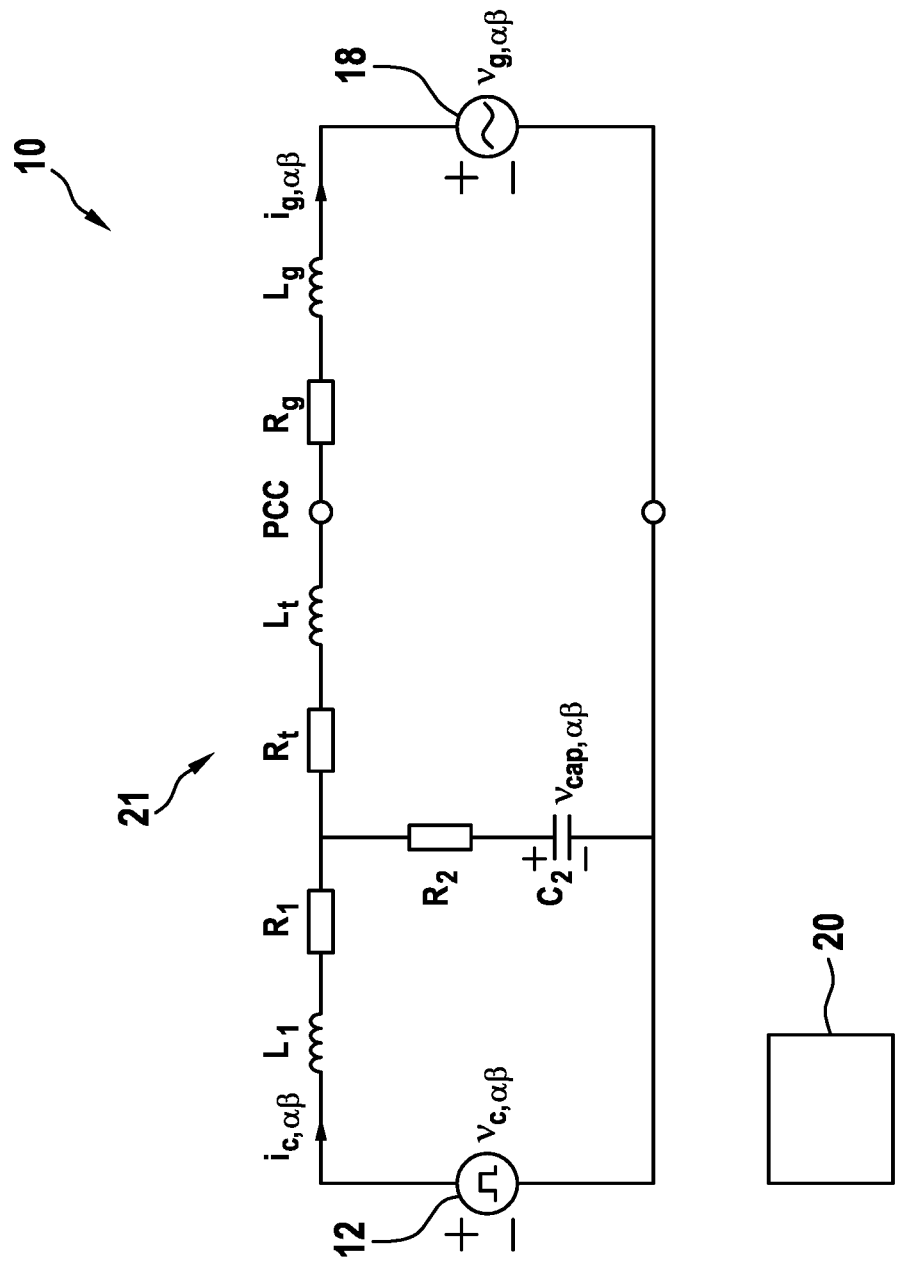
FIG. 2 schematically shows a model of the converter system of FIG. 1 in $\alpha\beta$ coordinates.

FIG. 2 shows a more abstract equivalent single-line circuit for the converter system 10 of FIG. 1. The transformer 16 has been replaced with the transformer leakage inductance $L_t$ and the transformer series resistor $R_t$. The LC-filter and the transformer are represented by an equivalent circuit of a resonant subsystem 21, which is connected between the converter 12 and the grid 18. The respective quantities shown in FIG. 2 have been transformed with the Clarke transformation (see below) from the three-phase abc system to the stationary orthogonal $\alpha\beta$ system. The respective quantities are listed at the end of the present description.

Figure 3:
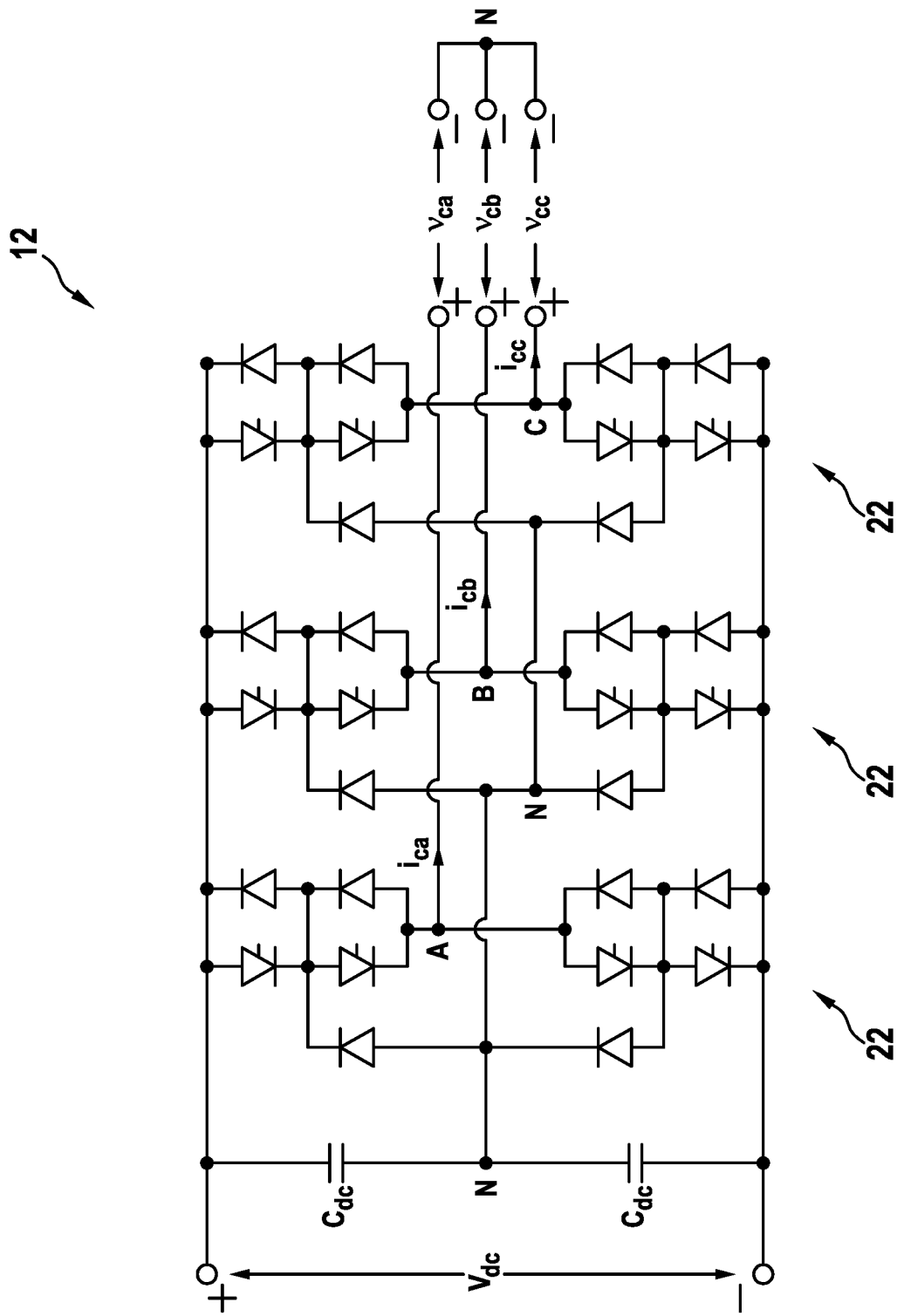
FIG. 3 shows a schematic circuit for an electrical converter used in the converter system of claims 1 and 2.

FIG. 3 shows an example for an electrical converter 12, which may be a neutral point clamped converter having a neutral point clamped phase arm 22 for each output phase. Other converters 12, such as T-type converters, modular multi-level converters and/or converters with flying capacitors may be used as multi-level converter 12.

System Model

In the controller 20, a mathematical and/or physical system model is used, which is described with respect to the system 10 with the three-level NPC converter 12 connected to the grid 18 via the LC filter and the transformer as shown in FIGS. 1 to 3. As already mentioned, the filter 14 may include the components $L_1$ and $C_2$, and their series resistances $R_1$ and $R_2$, respectively. The transformer 16 may be represented by its leakage inductance $L_t$ and series resistance $R_t$. The grid 18 may be approximated by the three-phase grid voltage $v_{g,abc}(t)$, an the grid inductance $L_g$ and the grid resistance $R_g$. The exact grid parameters may be unknown.

The converter system 10 may be connected to the grid 18 at the point of common coupling (PCC). Harmonic grid codes may be imposed at this point. To simplify the problem at hand, it may be assumed that the grid voltage and parameters are known. All quantities are referred to the secondary side of the transformer 16.

The three-phase converter current $i_{c,abc}(t)$, the capacitor voltage $v_{cap,abc}(t)$, the grid current $i_{g,abc}(t)$, the grid voltage $v_{g,abc}(t)$ and the converter voltage $v_{c,abc}(t)$ are transformed by a Clarke transformation (6, see below) to the stationary orthogonal $\alpha\beta$ reference frame. The system model is shown in FIG. 2 in $\alpha\beta$ coordinates.

From this, the following dynamical equations of the system 10 in the stationary orthogonal reference frame are derived $$L_1 \frac{di_{c,\alpha\beta}(t)}{dt} = -R_1 i_{c,\alpha\beta}(t) - R_2(i_{c,\alpha\beta}(t) - (i_{g,\alpha\beta}(t)) - v_{cap,\alpha\beta}(t) + v_{c,\alpha\beta}(t) \quad (1a)$$

$$C_2 \frac{dv_{cap,\alpha\beta}(t)}{dt} = i_{c,\alpha\beta}(t) - i_{g,\alpha\beta}(t) \quad (1b)$$

$$(L_t + L_g) \frac{di_{g,\alpha\beta}(t)}{dt} = \quad (1c)$$

$$-(R_t + R_g)i_{g,\alpha\beta}(t) + R_2(i_{c,\alpha\beta}(t) - i_{g,\alpha\beta}(t)) + v_{cap,\alpha\beta}(t) - v_{g,\alpha\beta}(t).$$

The converter voltage $$v_{c,\alpha\beta}(t) = \frac{V_{dc}}{2} K_{\alpha\beta} u_{abc}(t) \quad (2)$$

is equal to the three-phase switching signal $u_{abc}(t)$ scaled with half the dc-link voltage $V_{dc}$. Note that the three-phase switching signal is defined as $u_{abc}(t) = [u_a(t) \; u_b(t) \; u_c(t)]^T$. For a three-level converter the switch positions are restricted to the set $u_{abc} \in \{-1,0,1\}^3$.

A state vector $$x_{\alpha\beta}(t)=[i_{c,\alpha\beta}{}^T(t)\; v_{cap,\alpha\beta}{}^T(t)\; i_{g,\alpha\beta}{}^T(t)\; v_{g,\alpha\beta}{}^T(t)]^T \quad (3)$$

is chosen, and the grid voltages are introduced as additional state variables in the system 10. The model of the converter system 10 in the αβ frame is then $$\frac{dx_{\alpha\beta}(t)}{dt} = Fx_{\alpha\beta}(t) + Gu_{abc}(t) \quad (4)$$

$$y_{\alpha\beta}(t) = Cx_{\alpha\beta}(t).$$

The system output $$a.\; y_{\alpha\beta}(t)=[i_{c,\alpha\beta}{}^T(t)\; v_{cap,\alpha\beta}{}^T(t)\; i_{g,\alpha\beta}{}^T(t)]^T$$

includes the converter current, capacitor voltage and grid current. The dimensions of the state, input and output vectors are given by $n_x$, $n_u$ and $n_y$, respectively. The system matrix $F \in \mathbb{R}^{n_x \times n_x}$, the input matrix $G \in \mathbb{R}^{n_x \times n_u}$ and the output matrix $C \in \mathbb{R}^{n_y \times n_x}$ are derived below.

The controller operates at the discrete time instants $t=kT_s$, with $k \in \mathbb{N}$. Transforming the continuous-time dynamical system (4) to the discrete-time domain with the sampling interval $T_s$ is done by exact discretization of the system:

$$x_{\alpha\beta}(k+1)=Ax_{\alpha\beta}(k)+Bv_{abc}(k)$$

$$y_{\alpha\beta}(k)=Cx_{\alpha\beta}(k), \quad (5)$$

where $A=e^{FT_s}$ and $B=F^{-1}(A-I_{n_x})G$. The matrix $I_{n_x}$ is the identity matrix of the size $n_x \times n_x$. The three-phase input signal $v_{abc}(k)=[v_a(k)\; v_b(k)\; v_c(k)]^T$ is the real-valued approximation of the switching signal in the discrete-time domain. We will refer to this as the averaged switch positions. This variable will be explained in detail below.

Clarke Transformation

A Clarke transformation is used to translate three-phase quantities from the abc system to the stationary orthogonal reference frame. More specifically, the Clarke transformation translates the three-phase quantity $\xi_{abc}=[\xi_a \xi_b \xi_c]^T$ to the vector $\xi_{\alpha\beta}=[\xi_\alpha \xi_\beta]^T$ and vice versa by:

$$\xi_{\alpha\beta}=K_{\alpha\beta}\xi_{abc}\; \text{and}\; \xi_{abc}=K_{\alpha\beta}^{-1}\xi_{\alpha\beta}, \quad (6)$$

where $K_{\alpha\beta}$ and $K_{\alpha\beta}^{-1}$ are the transformation matrices given by:

$$K_{\alpha\beta} = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix},\; K_{\alpha\beta}^{-1} = \begin{bmatrix} 1 & 0 \\ -\frac{1}{2} & \frac{\sqrt{3}}{2} \\ -\frac{1}{2} & -\frac{\sqrt{3}}{2} \end{bmatrix}. \quad (7)$$

The scaling factor ⅔ is needed to ensure invariance of the amplitudes.

Continuous-Time System Model (2) is inserted into (1), and the notation is simplified by combining the grid and transformer inductances and resistances to $$L_3=L_t+L_g\; \text{and}\; R_3=R_t+R_g.$$

This leads to $$\frac{di_{c,\alpha\beta}(t)}{dt} = -\frac{R_1+R_2}{L_1}i_{c,\alpha\beta}(t) - \frac{1}{L_1}v_{cap,\alpha\beta}(t) + \frac{R_2}{L_1}i_{g,\alpha\beta}(t) + \frac{V_{dc}}{2L_1}K_{\alpha\beta}u_{abc}(t) \quad (8a)$$

$$\frac{dv_{cap,\alpha\beta}(t)}{dt} = \frac{1}{C_2}i_{c,\alpha\beta}(t) - \frac{1}{C_2}i_{g,\alpha\beta}(t) \quad (8b)$$

$$\frac{di_{g,\alpha\beta}(t)}{dt} = \frac{R_2}{L_3}i_{c,\alpha\beta}(t) + \frac{1}{L_3}v_{cap,\alpha\beta}(t) - \frac{R_2+R_3}{L_3}i_{g,\alpha\beta}(t) - \frac{1}{L_3}v_{g,\alpha\beta}(t). \quad (8c)$$

When it is assumed that the grid voltages are perfectly sinusoidal quantities, they can be stated in the stationary orthogonal coordinate system as $$v_{g,\alpha\beta}(t) = \hat{v}_g \begin{bmatrix} \sin(\omega_g t - \theta_g) \\ -\cos(\omega_g t - \theta_g) \end{bmatrix}, \quad (9)$$

where $\hat{v}_g$ is the amplitude of the grid voltage, $\omega_g=2\pi f_g$ is the angular grid frequency, and $\theta_g$ is the phase angle. The derivative of the grid voltage follows as $$\frac{dv_{g,\alpha\beta}(t)}{dt} = \hat{v}_g \omega_g \begin{bmatrix} \cos(\omega_g t - \theta_g) \\ \sin(\omega_g t - \theta_g) \end{bmatrix} = \begin{bmatrix} 0 & -\omega_g \\ \omega_g & 0 \end{bmatrix} v_{g,\alpha\beta}(t). \quad (10)$$

Writing (8) in vector notation with the definition of the state vector (3) directly leads to the compact continuous-time model (4) with the system, input and output matrices $$F = \begin{bmatrix} -\frac{R_1+R_2}{L_1}I_2 & -\frac{1}{L_1}I_2 & \frac{R_2}{L_1}I_2 & 0_2 \\ \frac{1}{C_2}I_2 & 0_2 & -\frac{1}{C_2}I_2 & 0_2 \\ \frac{R_2}{L_3}I_2 & \frac{1}{L_3}I_2 & -\frac{R_2+R_3}{L_3}I_2 & -\frac{1}{L_3}I_2 \\ 0_2 & 0_2 & 0_2 & \begin{bmatrix} 0 & -\omega_g \\ \omega_g & 0 \end{bmatrix} \end{bmatrix},$$

$$G = \begin{bmatrix} \frac{V_{dc}}{2L_1}I_2 & 0_{2\times 6} \end{bmatrix}^T K_{\alpha\beta}\; \text{and}\; C = [\;I_6\; 0_{6\times 2}\;].$$

Note that $I_2$ and $0_2$ are the identity and the zero matrix of the size 2×2, respectively. The identity matrix $I_6$ is of the size 6×6.

Overall Control Method

A block diagram of a controller 20 for performing the method as described above and below is shown in FIG. 4. The controller includes a converter voltage determination block 24, a pattern and reference trajectory loader block 26, a switching table determination block 28, a reference trajectory determination block 30 and a pulse pattern controller block 32. These blocks and also the blocks described with respect to the following drawings may be modules of a computer program performed in the controller 20 and/or may be blocks of hardware adapted for performing the respective functionality.

In the converter voltage determination block 24, the amplitude of the grid voltage is obtained from the absolute value of the measured grid voltage. From the real and reactive power references, P* and Q*, the required load angle γ* can be obtained. This may be done with the help of a phasor analysis using the system model shown in FIG. 2.

The phasor analysis also provides the required converter voltage, which can be mapped into the necessary modulation index m using the measured dc-link voltage $V_{dc}$.

The modulation index m is passed to the reference and pattern loader 26 together with the specified pulse number d. Based on these two parameters, the required OPP is loaded from a look-up table. The OPP is represented by the single-phase vectors A* and U*. The former holds the switching angles over one fundamental waveform, whereas the latter holds the corresponding single-phase switch positions.

The corresponding reference trajectory $Y^*_{1conv,\alpha\beta}(\theta)$ with a converter contribution is also loaded from the lookup table, which provides the references for the output variables when applying the OPP and when assuming a zero grid voltage. The reference trajectory $Y^*_{1conv,\alpha\beta}(\theta)$ may be provided at the angle samples $\theta^*_1$.

In the switching table determination block 28, the switching table holds in each phase the next $n_p$, with $p \in \{a,b,c\}$, switching transitions within a prediction horizon interval. To compute the entries of the switching table, which correspond to a switching signal, the three-phase pulse pattern is created from the single-phase vectors A* and U*. The desired angular position $\theta^*_c$ on the pulse pattern is determined with the help of the voltage grid angle $\theta_g$ at the current sampling time and the load angle. The switching angles are translated into switching instants by $$t^*_{pi} = \frac{\alpha^*_{pi}}{\omega_g}, \quad (11)$$

where $\omega_g$ denotes the angular grid frequency. A suitable time offset might be subtracted from $t^*_{pi}$ in (11). Finally, the switching transitions that fall within the prediction horizon are selected and stored with their nominal switching instant $t^*_{pi}$ and switch position $u^*_{pi}$ in the three-phase switching signal $T^*_{abc}$ and $U^*_{abc}$.

In the reference trajectory determination block 30, the reference trajectories $Y^*_{\alpha\beta}(k)$ for at least one electrical quantity of the converter system 10 are determined from the reference trajectory $Y^*_{1conv,\alpha\beta}(\theta)$ with the converter contribution and further quantities. The offline computed reference trajectory $Y^*_{1conv,\alpha\beta}(\theta)$ may be a function of only the converter voltage (the grid voltage is set to zero) at the support points $\theta^*_1$. During online operation, the desired angular position $\theta^*_c$ on the trajectory may be determined, and the reference vectors $Y^*_{conv,\alpha\beta}(k)$ for the next N sampling instants may be selected by interpolation. The grid-voltage-dependent trajectory $Y^*_{grid,\alpha\beta}(k)$ is computed and both trajectories are superimposed. This will be described in more detail with respect to FIG. 5. The resulting reference trajectory $Y^*_{\alpha\beta}(k)$ over the prediction horizon is passed to the pulse pattern controller 32.

Figure 6:
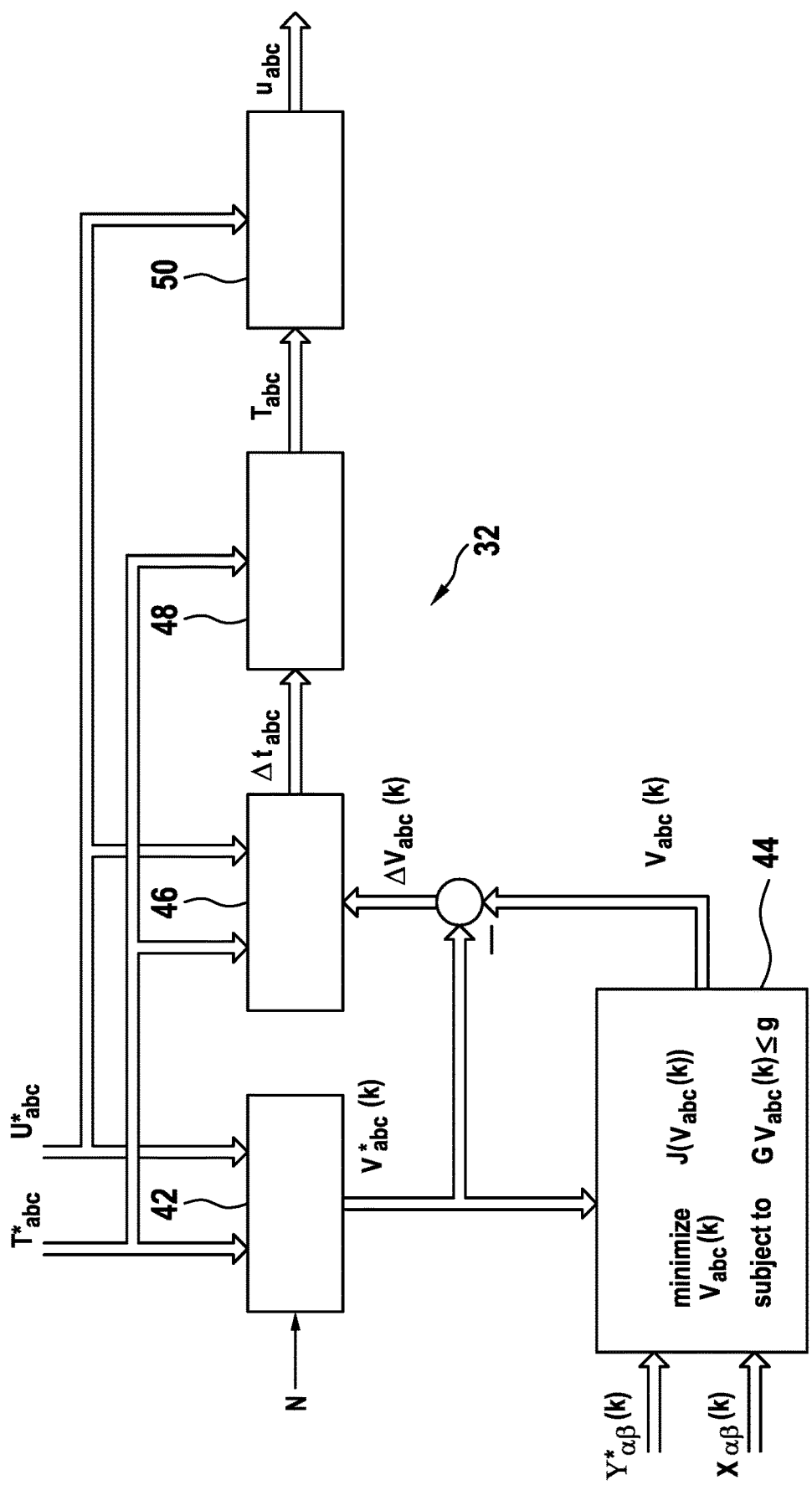
FIG. 6 shows a block diagram of a part of the controller of FIG. 4.

The pulse pattern controller 32, which is described in more detail with respect to FIG. 6, receives the switching table with the entries $T^*_{abc}$ and $U^*_{abc}$, the reference trajectory $Y^*_{\alpha\beta}(k)$ and the measured (or estimated) state vector $x_{\alpha\beta}(k)$ at the current sampling instant. After transforming the switching signal to the discrete-time domain and producing the sequence of averaged switch positions $V^*_{abc}(k)$, a quadratic program is solved as described below, which results in the sequence of optimal averaged switch positions $V_{abc}(k)$. From this, the averaged switch position modifications are determined. These are transformed back in continuous-time to switching instant modifications and used to update the nominal OPP switching instants. From this the modified continuous-time switching signal $u_{abc}(t)$ is determined and applied to the converter for the current sampling interval, i.e. until the next sampling instant.

Typically, the switching instants within the current sampling interval along with the new switch positions are provided to the converter. This concept may be based on time stamps. Alternatively, a single switch position can be computed, e.g. by rounding the averaged switch position to the nearest integer switch position.

Pulse Number, Switching Signal and Optimized Pulse Patterns

For the converter 12 of FIGS. 1 to 3, at each terminal the fundamental voltage component $$v_{cp}(t) = \frac{V_{dc}}{2} m \sin(\omega_1 t), \quad (12)$$

is produced, where $p \in \{a,b,c\}$ denotes the phase, $V_{dc}$ is the total dc-link voltage, $m \in [0, 4/\pi]$ is the modulation index, $\omega_1 = 2\pi f_1$ denotes the angular fundamental frequency, and $t \in \mathbb{R}$ is the time. The pulse number $$d = \frac{f_{sw}}{f_1} \quad (13)$$

is defined as the ratio between the switching frequency $f_{sw}$ of one semiconductor switch and the fundamental frequency $f_1$.

To characterize the general periodic switching signal, a fundamental period of $2\pi$ is assumed. The $2\pi$-periodic switching signal $u^*(\theta)$ with pulse number d is defined by 4d switching angles $\alpha^*_i$ with $i \in \{1, \ldots, 4d\}$ and 4d+1 switch positions $u^*_i$ with $i \in \{0, \ldots, 4d\}$, see FIG. 7. The ith switching angle corresponds to the ith switching transition $$\Delta u^*_i = u^*_i - u^*_{i-1}. \quad (14)$$

Switching by more than one level up or down is generally prohibited for multi-level converters; this restricts the switching transitions to $\Delta u^*_i \in \{-1,1\}$. Furthermore, for the three-level converter, the switch positions are restricted to $u^*_i \in \{-1,0,1\}$.

Figure 7:
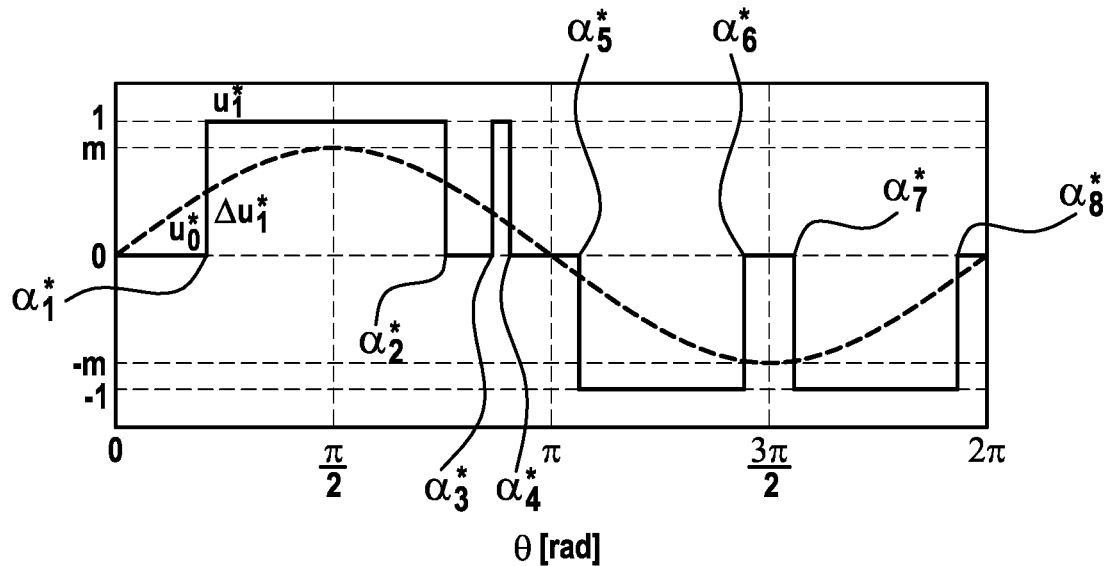
FIG. 7 shows a diagram with an optimized pulse pattern.

FIG. 7 shows an example for an optimized pulse pattern, from which the switching signal may be derived.

Optimized pulse patterns A*, U* may be the solution to an optimization problem subject to constraints. From the definition of the general switching signal follows that there are two sets of optimization variables in the optimization problem: the set of switching angles $A^* = [\alpha^*_1 \ldots \alpha^*_{4d}]^T$ and the set of switch positions $U^* = [u^*_0 \, u^*_1 \ldots u^*_{4d}]^T$, which also contains the initial switch position.

Typically, a cost function J(A*, U*) for optimizing the optimized pulse patterns A*, U* may capture the total demand distortion (TDD) of the current, which is either the grid current of a grid-connected converter or the stator current of a machine-side inverter. The current TDD $$I_{TDD} = \frac{1}{\sqrt{2} I_{nom}} \sqrt{\sum_{n \neq 1} (\hat{i}_n)^2} \quad (15)$$

is the square root of the sum of the squared current harmonic amplitudes $\hat{i}_n$ of order n relative to the nominal (or rated) current, where $I_{nom}$ is the rms value of the nominal current.

The general OPP optimization problem minimizes the objective function J(A*, U*) subject to the following constraints:

The dc-component of the switching signal is zero;

The phase of the fundamental component is zero;

The amplitude of the fundamental component, $\hat{u}_1$, is equal to the modulation index m;

The switching angles are sorted in an ascending order; and

The switching transitions $\Delta u^*_i$ are limited to ±1.

This leads to the general OPP optimization problem of the following form:

$$\underset{A^*, U^*}{\text{minimize}} \; J(A^*, U^*)$$

$$\text{subject to } a_0 = 0, \; a_1 = 0, \; b_1 = m \quad (16)$$

i. $0 \leq \alpha_1^* \leq \alpha_2^* \leq \ldots \leq \alpha_{4d}^* \leq 2\pi$ ii. $u_i^* \in \{-1, 0, 1\}$ and $\Delta u_{i+1}^* = u_{i+1}^* - u_i^* \in \{-1, 1\}$
$\forall i \in \{0, \ldots, 4d-1\}$, where $a_0$, $a_1$ and $b_1$ are the Fourier coefficients of the switching signal $u^*(\theta)$.

Reference Trajectories

The reference trajectories may be the steady-state waveforms of the nominal output variables over one fundamental period. These are directly obtained from the nominal OPP (assuming no disturbances, no dc-link voltage ripple, no ripple on the neutral point potential, etc.). Note that the output variables are a subset of the states.

In order to calculate the reference trajectories, the converter and grid voltages may be considered separately as inputs to the system using the notion of superposition. In this way, the grid voltages may be removed from the state vector, and the reduced state vector $$\tilde{x}_{\alpha\beta}(t) = [i_{c,\alpha\beta}^T(t) \; v_{cap,\alpha\beta}^T(t) \; i_{g,\alpha\beta}^T(t)]^T$$

with $\tilde{n}_x = 6$ state variables may be defined. The corresponding continuous-time state-space model $$\frac{d\tilde{x}_{\alpha\beta}(t)}{dt} = \tilde{F}\tilde{x}_{\alpha\beta}(t) + \tilde{G}_1 u_{abc}^*(t) + \tilde{G}_2 v_{g,\alpha\beta}(t) \quad (17a)$$

$$y_{\alpha\beta}^*(t) = \tilde{x}_{\alpha\beta}(t) \quad (17b)$$

treats the grid voltage as a time-varying parameter. In this model, the state and output variables are the same; this implies $\tilde{n}_y = \tilde{n}_x$.

To compute the matrices of the reduced state-space model (17a), the grid voltage may be treated as a parameter instead of a state variable. The new system matrix $\tilde{F}$ can be derived from F by removing the seventh and eighth dimension $$\tilde{F} = \begin{bmatrix} -\frac{R_1 + R_2}{L_1} I_2 & -\frac{1}{L_1} I_2 & \frac{R_2}{L_1} I_2 \\ \frac{1}{C_1} I_2 & 0_2 & -\frac{1}{C_2} I_2 \\ \frac{R_2}{L_3} I_2 & \frac{1}{L_3} I_2 & -\frac{R_2 + R_3}{L_3} I_2 \end{bmatrix}. \quad (18)$$

The input matrix G may be replaced by the two new input matrices $$\tilde{G}_1 = \begin{bmatrix} \frac{V_{dc}}{2L_1} I_2 & 0_{2\times 4} \end{bmatrix}^T K_{\alpha\beta} \text{ and } \tilde{G}_2 = \begin{bmatrix} 0_{2\times 4} & -\frac{1}{L_3} I_2 \end{bmatrix}^T. \quad (19)$$

Reference Trajectory Computation

The controller requires the reference vectors at the next N sampling instants $$Y^*_{\alpha\beta}(k) = [y^*_{\alpha\beta}{}^T(k+1) y^*_{\alpha\beta}{}^T(k+2) \ldots y^*_{\alpha\beta}{}^T(k+N)]^T.$$

Figure 5:
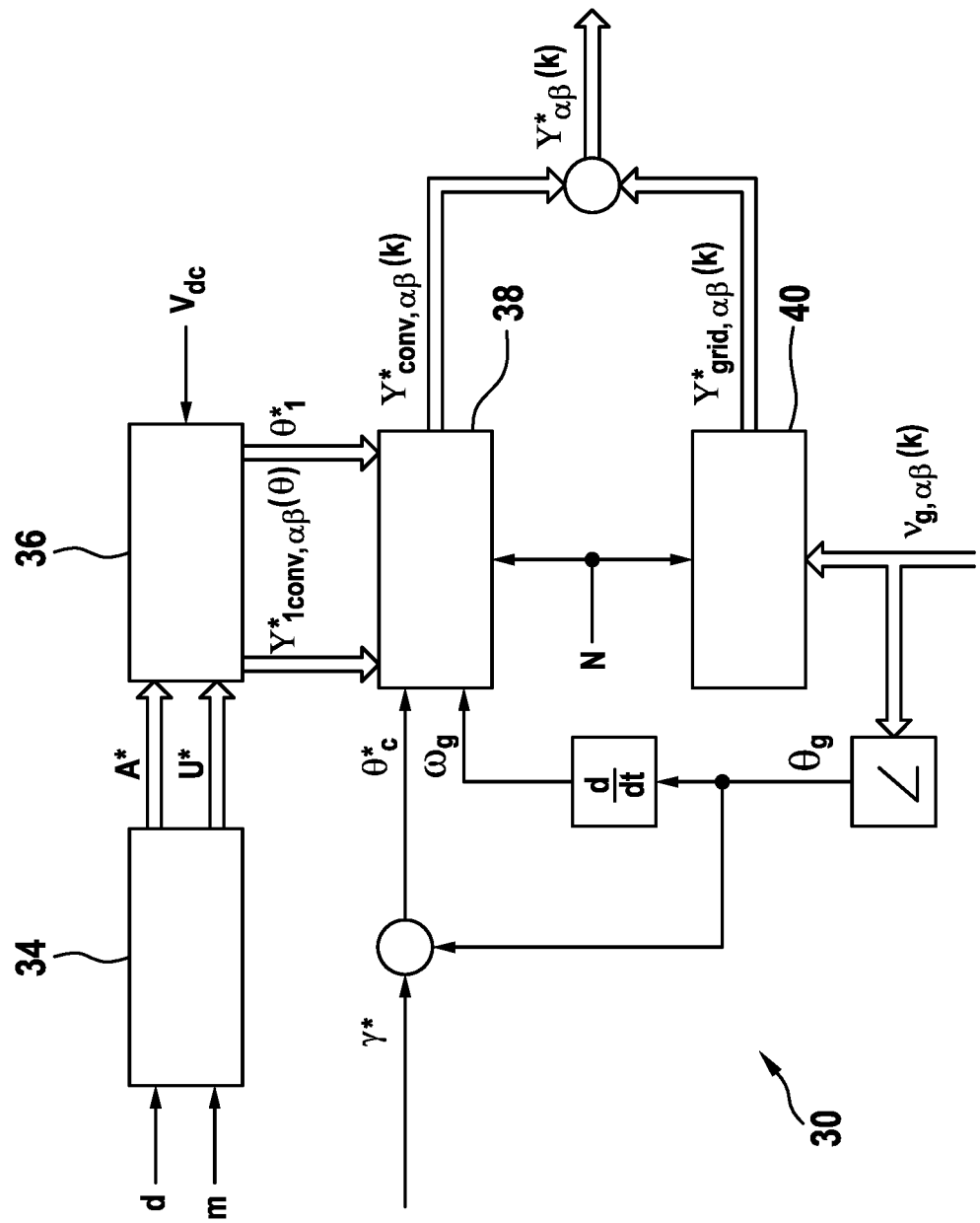
FIG. 5 shows a block diagram of a part of the controller of FIG. 4.

By using the method of superposition, the contributions to the reference trajectories of the converter voltage $Y^*_{conv,\alpha\beta}(k)$ and of the grid voltage $Y^*_{grid,\alpha\beta}(k)$ are computed separately. This is shown in FIG. 5 in more detail. First the output trajectories as a function of the converter voltage may be computed; this computation may be done offline for all required modulation indices and pulse numbers. A pattern loader 34 may load the optimized pulse pattern A*, U*. From this the reference trajectories $Y^*_{1conv,\alpha\beta}(\theta)$ over one fundamental period may be determined in reference computation block 36. These trajectories contain the reference vectors at the freely chosen reference sampling instants $\theta^*_1$ and are stored together with the optimized pulse patterns A*, U* in look-up tables. During online operation, the offline computed trajectories over one fundamental period $Y^*_{1conv,\alpha\beta}(\theta)$ and the reference sampling vector $\theta^*_1$ may be loaded by the reference and pattern loader 26. From this, the appropriate reference vectors for the next N sampling instants may be selected as $Y^*_{conv,\alpha\beta}(k)$ by the reference selector block 38. The output trajectories as a function of the grid voltage $Y^*_{grid,\alpha\beta}(k)$ for the next N sampling instants may also be computed online in reference computation block 40. Both output trajectories are then superimposed to yield the trajectory of the overall output vector $Y^*_{\alpha\beta}(k)$.

Converter Contribution Trajectory Computation
(Block 36)

Consider the nominal OPP with the modulation index m and pulse number d with the vector of switching angles A* and the vector of switch positions U*. From these, the three-phase switching signal $u^*_{abc}(\theta)$ can be constructed, which has 4d switching transitions in any of the three phases. A single switching angle vector is created, containing the $n = 3 \cdot 4d$ switching angles sorted in ascending order $\alpha = [\alpha_0 \; \alpha_1 \; \alpha_2 \; \ldots \; \alpha_{n+1}]^T$. New names are assigned to the switching angles according to their sorted position. Note that the initial angle $\alpha_0 = 0$ and the terminal angle $\alpha_{n+1} = 2\pi$ are added to ease the computation over one fundamental period of $2\pi$.

The constant three-phase switch position $u^*_{abc}(\alpha_i)$ may be determined between two consecutive switching angles $\alpha_i$ and $\alpha_{i+1}$. Given the state vector $\tilde{x}_{conv,\alpha\beta}(\alpha_i)$ at $\alpha_i$ the state vector at the next switching angle $\alpha_{i+1}$ is computed using (17a) in which the grid voltage $v_{g,\alpha\beta}$ is set to zero:

$$\tilde{x}_{conv,\alpha\beta}(\alpha_{i+1}) = e^{\tilde{F}(\alpha_{i+1}-\alpha_i)}\tilde{x}_{conv,\alpha\beta}(\alpha_i) + \int_{\alpha_i}^{\alpha_{i+1}} e^{\tilde{F}\tau}d\tau \tilde{G}_1 u^*_{abc}(\alpha_i)$$

$$a. = \tilde{A}_i \tilde{x}_{conv,\alpha\beta}(\alpha_i) + \tilde{B}_i u^*_{abc}(\alpha_i), \quad (20)$$

where i. $\tilde{A}_i = e^{\tilde{F}(\alpha_{i+1}-\alpha_i)}$ and $\tilde{B}_i = \tilde{F}^{-1}[\tilde{A}_i - I_{\tilde{n}_x}]\tilde{G}_1$ (21)

and $i \in \{0, 1, 2, \ldots, n+1\}$. Now (20) can be recursively inserted to compute the state vector at the switching angles over the entire fundamental period i. $\tilde{x}_{conv,\alpha\beta}(\alpha_1) = \tilde{A}_0 \tilde{x}_{conv,\alpha\beta}(\alpha_0) + \tilde{B}_0 u^*_{abc}(\alpha_0)$ (22)

ii. $\tilde{x}_{conv,\alpha\beta}(\alpha_2) = \tilde{A}_1 \tilde{x}_{conv,\alpha\beta}(\alpha_1) + \tilde{B}_1 u^*_{abc}(\alpha_1)$ a. $= \tilde{A}_1 \tilde{A}_0 \tilde{x}_{conv,\alpha\beta}(\alpha_0) + \tilde{A}_1 \tilde{B}_0 u^*_{abc}(\alpha_0) + \tilde{B}_1 u^*_{abc}(\alpha_1)$ (23)

iii. $\tilde{x}_{conv,\alpha\beta}(\alpha_3) = \tilde{A}_2 \tilde{x}_{conv,\alpha\beta}(\alpha_2) + \tilde{B}_2 u^*_{abc}(\alpha_2)$ a. $= \tilde{A}_2 \tilde{A}_1 \tilde{A}_0 \tilde{x}_{conv,\alpha\beta}(\alpha_0) + \tilde{A}_2 \tilde{A}_1 \tilde{B}_0 u^*_{abc}(\alpha_0) +$ b. $\tilde{A}_2 \tilde{B}_1 u^*_{abc}(\alpha_1) + \tilde{B}_2 u^*_{abc}(\alpha_2)$ (24)

c. $\vdots$ iv. $\tilde{x}_{conv,\alpha\beta}(\alpha_{n+1}) = \tilde{A}_n \tilde{x}_{conv,\alpha\beta}(\alpha_n) + \tilde{B}_n u^*_{abc}(\alpha_n)$ a. $= \tilde{A}_n \tilde{A}_{n-1} \ldots \tilde{A}_0 \tilde{x}_{conv,\alpha\beta}(\alpha_0) + \tilde{A}_n \tilde{A}_{n-1} \ldots \tilde{A}_1 \tilde{B}_0 u^*_{abc}(\alpha_0) +$ b. $\tilde{A}_n \tilde{A}_{n-1} \ldots \tilde{A}_2 \tilde{B}_1 u^*_{abc}(\alpha_1) + \ldots + \tilde{A}_n \tilde{A}_{n-1} \tilde{B}_{n-2} u^*_{abc}(\alpha_{n-2}) +$ c. $\tilde{A}_n \tilde{B}_{n-1} u^*_{abc}(\alpha_{n-1}) + \tilde{B}_n u^*_{abc}(\alpha_n)$ (25)

The product of the matrices can be simplified by noting that $$\tilde{A}_n \tilde{A}_{n-1} \ldots \tilde{A}_i = e^{\tilde{F}(\alpha_{n+1}-\alpha_n)}e^{\tilde{F}(\alpha_n-\alpha_{n-1})} \ldots e^{\tilde{F}(\alpha_{i+1}-\alpha_i)} = e^{\tilde{F}(\alpha_{n+1}-\alpha_i)}. \quad (26)$$

The first term in (25) further reduces to $$\tilde{A}_n \tilde{A}_{n-1} \ldots \tilde{A}_0 = e^{\tilde{F}(\alpha_{n+1}-\alpha_0)} = e^{\tilde{F}2\pi}. \quad (27)$$

With (26) and (27), (25) can be rewritten as $$\tilde{x}_{conv,\alpha\beta}(\alpha_{n+1}) = e^{\tilde{F}2\pi}\tilde{x}_{conv,\alpha\beta}(\alpha_0) + \Sigma_{i=0}^{n} e^{\tilde{F}(\alpha_{n+1}-\alpha_{i+1})}\tilde{B}_i u^*_{abc}(\alpha_i). \quad (28)$$

Due to periodicity, $$\tilde{x}_{conv,\alpha\beta}(\alpha_0) = \tilde{x}_{conv,\alpha\beta}(\alpha_{n+1}). \quad (29)$$

With (28) inserted into (29), the initial state vector $$\tilde{x}_{conv,\alpha\beta}(\alpha_0) = [I_{\tilde{n}_x} - e^{\tilde{F}2\pi}]^{-1}\Sigma_{i=0}^{n} e^{\tilde{F}(\alpha_{n+1}-\alpha_{i+1})}\tilde{B}_i u^*_{abc}(\alpha_i) \quad (30)$$

is derived as a function of the switching signal. Owing to $\alpha_0 = 0$ and (17b), (30) states the nominal output vector $y^*_{conv,\alpha\beta}(0)$ at the beginning of the fundamental period, where $\theta = 0$.

In the following, the evolution of the nominal output vector over the fundamental period is computed. To do so, the angle between 0 and $2\pi$ is gridded with the angle interval $\Delta\theta^*$, and the output vectors at the reference angles $\theta^*_1 = [0 \ \Delta\theta^* \ldots 2\pi]^T$ are computed with the reduced system model (17a)

$$\frac{dy^*_{conv,\alpha\beta}(\theta)}{dt} = \tilde{F} y^*_{conv,\alpha\beta}(\theta) + \tilde{G}_1 u^*_{abc}(\theta). \quad (31)$$

The reference sampling instants $\theta^*_1$ and the resulting trajectory of nominal output vectors $$Y^*_{1conv,\alpha\beta}(\theta) = [y^*_{conv,\alpha\beta}^T(0) \ y^*_{conv,\alpha\beta}^T(\Delta\theta^*) \ldots y^*_{conv,\alpha\beta}^T(2\pi)]^T \quad (32)$$

may be stored for one fundamental period in a look-up table. This may be done for each pulse number and modulation index.

Reference Selector (Block 38)

Figure 8:
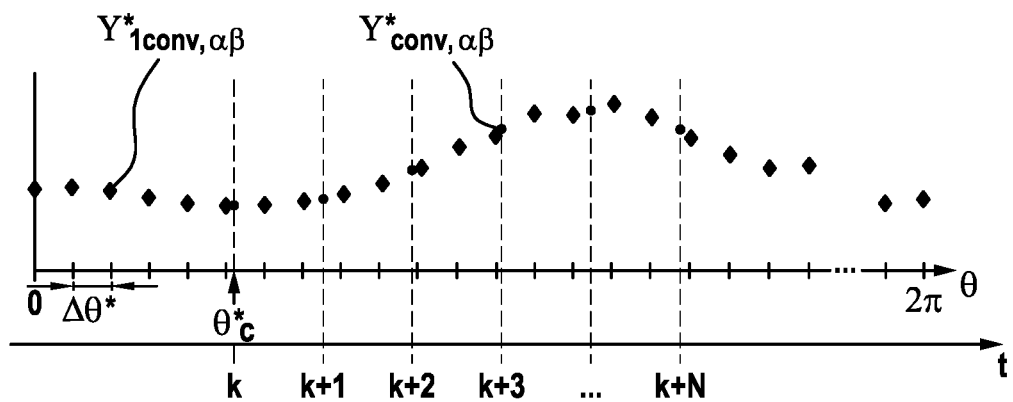
FIG. 8 shows a diagram with reference trajectories used during the method performed by the controller of FIGS. 4 to 6.

The reference selector 38 may load the precomputed output trajectories $Y^*_{1conv,\alpha\beta}(\theta)$ for the appropriate pulse number d and modulation index m, and may select from these the reference vectors for the next N sampling instants in the following way, see also FIG. 8. First, the angular position of the converter voltage, $\theta^*_c$, is determined from the grid voltage angle $\theta_g$ and the load angle $\gamma^*$ according to $$\theta^*_c = \theta_g + \gamma^*. \quad (33)$$

Figure 9:
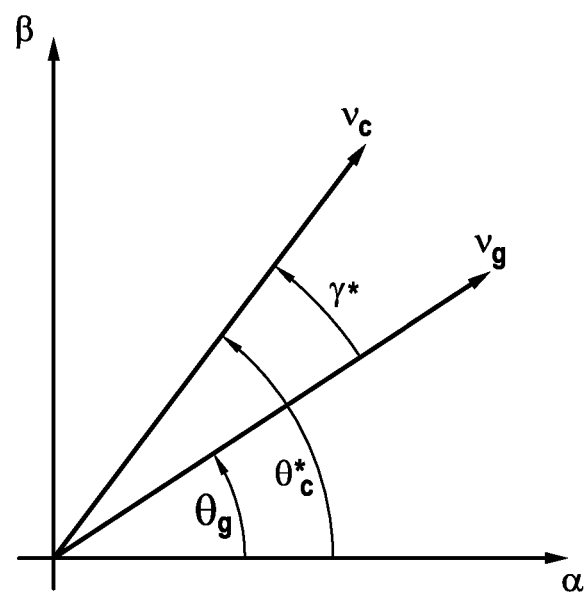
FIG. 9 shows a diagram explaining the determination of angles during the method performed by the controller of FIGS. 4 to 6.
Figure 10A:
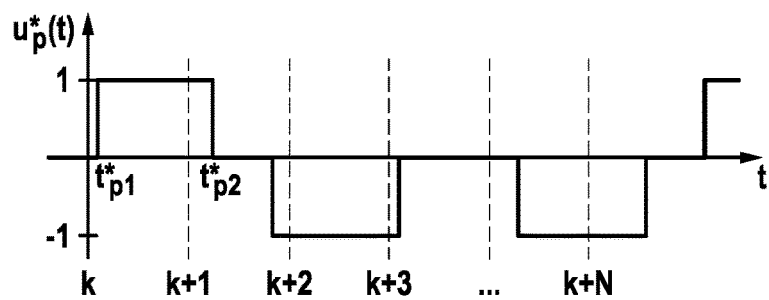
FIGS. 10a to 10d show switching signals and averaged switch positions used during the method performed by the controller of FIGS. 4 to 6.
Figure 10B:
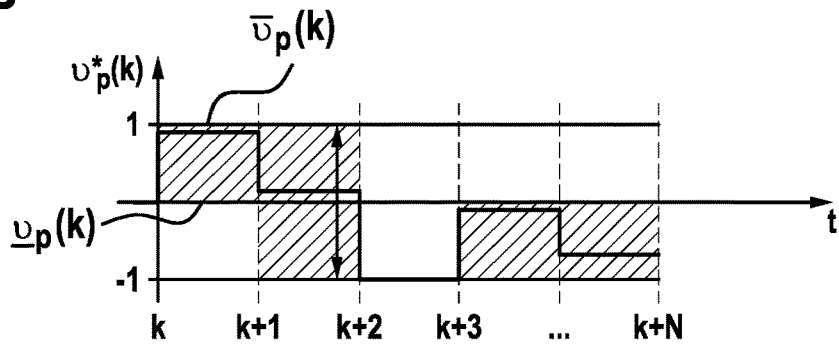
Figure 10C:
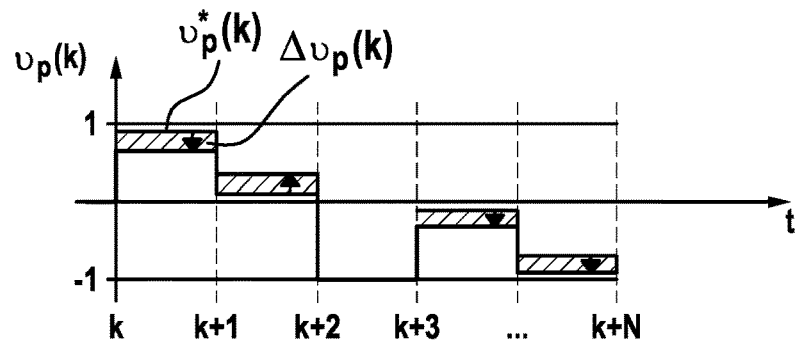
Figure 10D:
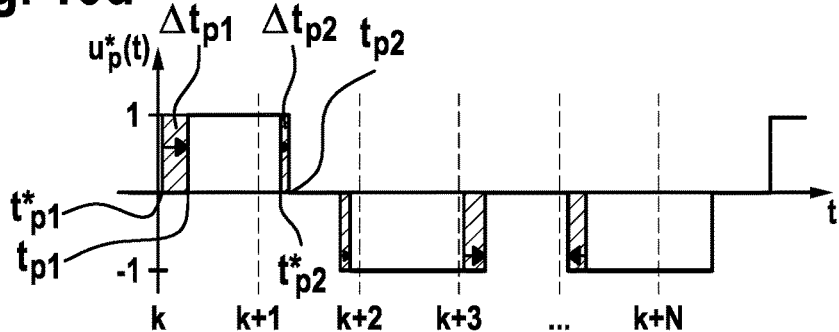

The load angle depends on the real and reactive power references, P* and Q*. In FIG. 9, an example of the converter and grid voltages is shown in the stationary orthogonal reference frame.

The nominal output vectors over the prediction horizon N $$Y^*_{conv,\alpha\beta}(k) = [y^*_{conv,\alpha\beta}^T(k+1) \ y^*_{conv,\alpha\beta}^T(k+2) \ldots y^*_{conv,\alpha\beta}^T(k+N)]^T$$

may be computed by interpolation.

Grid Contribution Trajectory Computation (Block 40)

For the online computation of the output trajectories as a function of the grid voltage, the converter voltage in (17a) may be set to zero and a perfect sinusoidal grid voltage may be assumed. The corresponding state vector is $\tilde{x}_{grid,\alpha\beta}$. The grid voltage is given in stationary orthogonal $\alpha\beta$ coordinates by $$v_{g,\alpha\beta}(t) = \hat{v}_g \begin{bmatrix} \sin(\omega_g t - \theta_g) \\ -\cos(\omega_g t - \theta_g) \end{bmatrix}, \quad (34)$$

where $\hat{v}_g$ is the amplitude of the grid voltage, $\omega_g = 2\pi f_g$ is the angular grid frequency, and $\theta_g$ is the phase. It follows that all state variables are sinusoidal signals with the grid frequency $\omega_g$. Each pair of state variables in stationary orthogonal coordinates can then be described by $$\xi_{\alpha\beta}(t) = \hat{\xi} \begin{bmatrix} \sin(\omega_g t - \theta_\xi) \\ -\cos(\omega_g t - \theta_\xi) \end{bmatrix} \quad (35)$$

and evolves according to the differential equation $$\frac{d\xi_{\alpha\beta}(t)}{dt} = \omega_g \begin{bmatrix} 0 & -1 \\ 1 & 0 \end{bmatrix} \xi_{\alpha\beta}(t). \quad (36)$$

The derivative of the state vector can be explicitly determined, and (17a) can be rewritten as $$\omega_j \begin{bmatrix} \begin{bmatrix} 0 & -1 \\ 1 & 0 \end{bmatrix} & 0_2 & 0_2 \\ 0_2 & \begin{bmatrix} 0 & -1 \\ 1 & 0 \end{bmatrix} & 0_2 \\ 0_2 & 0_2 & \begin{bmatrix} 0 & -1 \\ 1 & 0 \end{bmatrix} \end{bmatrix} \tilde{x}_{grid,\alpha\beta}(t) = \tilde{F}\tilde{x}_{grid,\alpha\beta}(t) + \tilde{G}_2 v_{g,\alpha\beta}(t). \quad (37)$$

Note that $0_2$ is the 2×2 zero matrix. Rearranging (37), the nominal output vector can be obtained as a function of the grid voltage $$y^*_{grid,\alpha\beta}(k)=[R-\tilde{F}]^{-1}\tilde{G}_2 v_{g,\alpha\beta}(k), \qquad (38)$$

where (17b) has been used. The matrix $$R = \omega_g \begin{bmatrix} \begin{bmatrix} 0 & -1 \\ 1 & 0 \end{bmatrix} & 0_2 & 0_2 \\ 0_2 & \begin{bmatrix} 0 & -1 \\ 1 & 0 \end{bmatrix} & 0_2 \\ 0_2 & 0_2 & \begin{bmatrix} 0 & -1 \\ 1 & 0 \end{bmatrix} \end{bmatrix}.$$

Superposition of the Reference Trajectories

By superposition, the overall resulting output trajectory of the system is derived as $$Y^*_{\alpha\beta}(k)=Y^*_{conv,\alpha\beta}(k)+Y^*_{grid,\alpha\beta}(k), \qquad (39)$$

which contains the output vectors for the next N sampling instants, i.e., $$Y^*_{\alpha\beta}(k)=[y^{*T}_{\alpha\beta}(k+1)\ y^{*T}_{\alpha\beta}(k+2)\ \ldots\ y^{*T}_{\alpha\beta}(k+N)]^T. \qquad (40)$$

This trajectory includes the offline computed contribution from the OPP and the online computed contribution from the grid voltage. It may be used by the controller 20 as a reference for the output variables over a prediction horizon.

Pulse Pattern Controller

Figure 4:
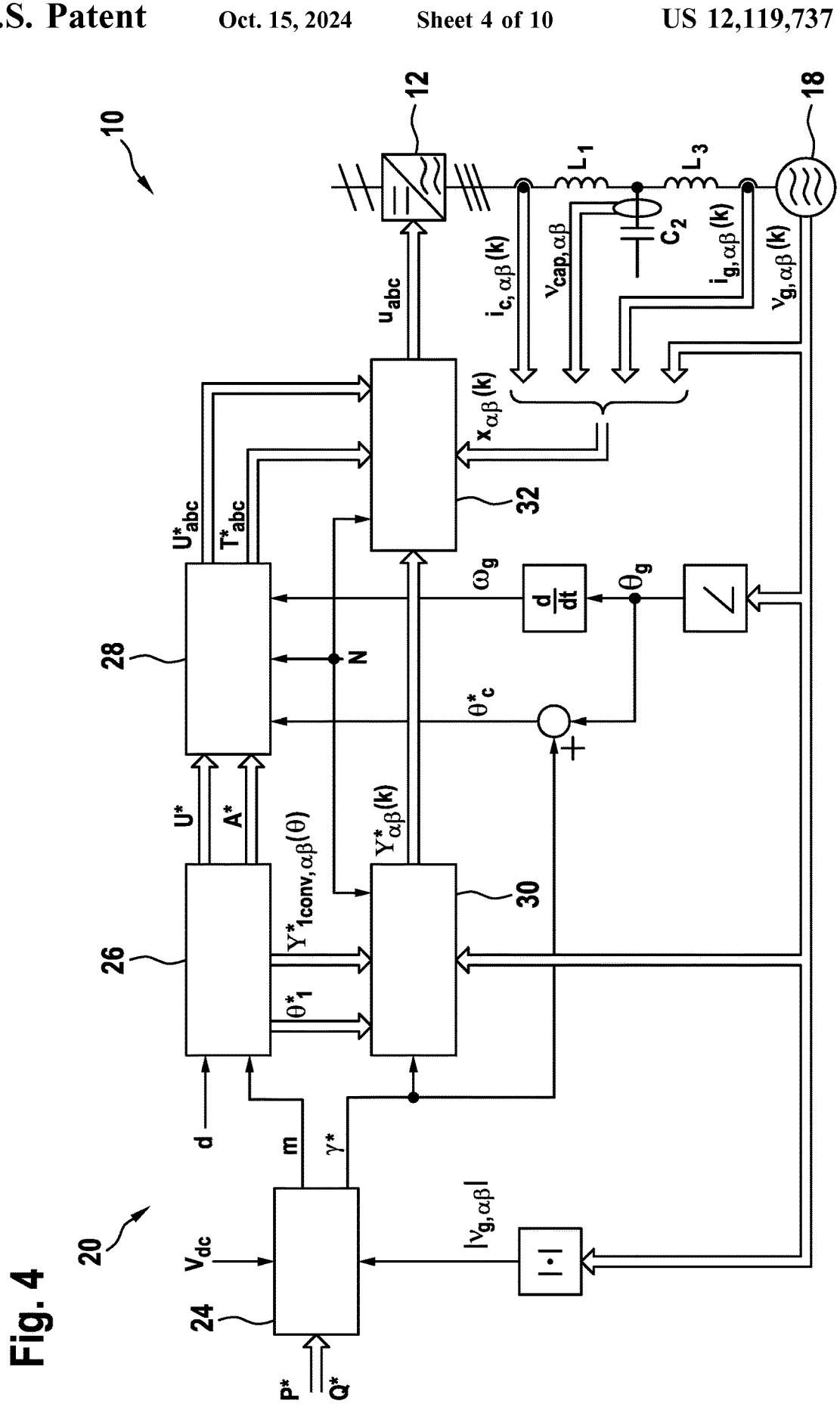
FIG. 4 shows a block diagram for a controller according to an embodiment of the disclosure.

FIG. 6 shows the pulse pattern controller of FIG. 4 in more detail. In the pulse pattern controller, to achieve optimal trajectory tracking, the continuous-time OPP is transformed into a sequence of averaged switch positions in discrete-time enabling the controller 20 to use a discrete-time model for the predictions. The switching signal transformation block 42 transforms the switching signal $u^*_{abc}(t)$, defined by the switching table with the entries $U^*_{abc}$ and $T^*_{abc}$, into the sequence of averaged switch positions $V^*_{abc}(k)$, which is optimized by optimizer block 44 to a sequence of optimized averaged switch positions $V_{abc}(k)$. With the sequence of optimized averaged switch position modifications $\Delta V_{abc}(k)$, time offsets $\Delta t_{abc}$ for the switching instants of the switching signal $u^*_{abc}(t)$ are determined in block 46, which are used for updating the switching table with the entries $U^*_{abc}$ and $T^*_{abc}$ in block 48. In block 50, the optimized switching signal $u_{abc}(t)$ for the current sampling interval is determined therefrom, which may be applied to the converter 12.

In particular, at the sampling instants $kT_s$, the switching table with the entries $U^*_{abc}$ and $T^*_{abc}$ contains the nominal three-phase switch positions and the nominal switching instants of the continuous-time OPP between the current time $kT_s$ and the end of the prediction horizon $(k+N)T_s$. From this, the real-valued discrete-time sequence of nominal averaged switch positions $V^*_{abc}(k)$ is generated over the prediction horizon by the switching signal transformation explained hereafter.

Switching Signal Transformation (Block 42)

Block 42 translates the continuous-time switching signal $u^*_{abc}(t)$ into the discrete-time averaged switch positions $v^*_{abc}(k)$. This is done separately for each phase. The discrete-valued switching signal $u^*_p(t)\in\{-1,0,1\}$, with $p\in\{a,$ b,c$\}$ and $t\in[kT_s,(k+1)T_s]$ is turned into the real-valued averaged switch position $v^*_p(k)\in[-1,1]$, which has the same average switch position within the kth sampling interval.

FIGS. 10a to 10d show as examples a single-phase nominal switching signal $u^*_p(t)$, single-phase averaged switch positions $v^*_p(k)$, optimized single-phase averaged switch positions $v_p(k)$ and an optimized single-phase switching signal $u_p(t)$, which are determined one from each other.

The single-phase switching signal $u^*_p(t)$ is constructed from the nominal switching table with the entries $T^*_{abc}$ and $U^*_{abc}$. This switching signal is defined from the current sampling instant $kT_s$ until the end of the prediction horizon $(k+N)T_s$. The switching signal approximation, the averaged switch position, is derived by averaging the continuous-time switching signal over the kth sampling interval $[kT_s,(k+1)T_s]$ according to $$v^*_p(k) = \frac{1}{T_s}\int_{kT_s}^{(k+1)T_s} u^*_p(t)dt. \qquad (41)$$

Let $n_{pk}$ be the number of switching transitions occurring in phase p within the kth sampling interval $$kT_s \leq t^*_{p1} \leq t^*_{p2} \leq \ldots \leq t^*_{pn_{pk}} \leq (k+1)T_s. \qquad (42)$$

For simplification in the derivation, the interval limits are renamed to $$t^*_{p0}=kT_s \text{ and } t^*_{p,n_{pk}+1}=(k+1)T_s. \qquad (43)$$

The switching signal has the constant switch position $u^*_{pi}$ between the switching instants $t^*_{pi}$ and $t^*_{p,i+1}$. With this, (41) is solved by splitting the integral into $n_{pk}+1$ intervals of constant switch position, which leads to $$v^*_p(k) = \frac{1}{T_s}\int_{t^*_{p0}}^{t^*_{p1}} u^*_{p0}dt + \frac{1}{T_s}\int_{t^*_{p1}}^{t^*_{p2}} u^*_{p1}dt + \ldots + \frac{1}{T_s}\int_{t^*_{pn_{pk}}}^{t^*_{p,n_{pk}+1}} u^*_{pn_{pk}}dt = \qquad (44)$$

$$\sum_{i=0}^{n_{pk}} \frac{1}{T_s}\int_{t^*_{pi}}^{t^*_{p,i+1}} u^*_{pi}dt = \sum_{i=0}^{n_{pk}} \frac{t^*_{p,i+1}-t^*_{pi}}{T_s} u^*_{pi}.$$

Defining the ith time interval of constant switch position $$\tau_{pi}=t^*_{p,i+1}-t^*_{pi} \text{ with } i=0, 1, \ldots, n_{pk}, \qquad (45)$$

(44) can be further simplified to $$v^*_p(k) = \sum_{i=0}^{n_{pk}} \frac{\tau_{pi}}{T_s} u^*_{pi}. \qquad (46)$$

This equation states the general transformation of the single-phase switching signal to the averaged switch position in the kth sampling interval, i.e. the kth averaged switch position, with $n_{pk}$ switching transitions in the kth sampling interval.

When $n_{pk}=0$, meaning there is no switching transition within the kth sampling interval, the time interval of constant switch position $\tau_{p0}$, as defined in (45), is $$\tau_{p0}=T_s. \qquad (47)$$

Inserting (47) in (46) results in $$v^*_p(k)=u^*_{p0}, \qquad (48)$$

which implies that the averaged switch position corresponds to the switch position of the nominal OPP during that sampling interval.

The nominal averaged switch positions of each phase for the kth sampling interval are aggregated in the three-phase nominal averaged switch position vector $v^*_{abc}(k)=[v^*_a(k) \; v^*_b(k) \; v^*_c(k)]^T$. The sequence of averaged switch positions may include averaged switch positions from the current sampling instant $kT_s$ until the end of the horizon at $(k+N)T_s$ $$V^*_{abc}(k)=[v^{*T}_{abc}(k) \; v^{*T}_{abc}(k+1) \; \ldots \; v^{*T}_{abc}(k+N-1)]^T. \quad (49)$$

Constraints on the Averaged Switch Positions

The three-phase averaged switch positions over the prediction horizon may be the manipulated variables of the controller. Their sequence may be defined as the vector $$V_{abc}(k)=[v^T_{abc}(k) \; v^T_{abc}(k+1) \ldots v^T_{abc}(k+N-1)]^T. \quad (50)$$

Consider phase p and assume $n_{pk}$ switching transitions in the kth sampling interval. Let $t_{pi}$ denote the ith modified switching instant, with $i \in \{1, 2, \ldots, n_{pk}\}$. It is required that the order of the switching instants remains unchanged in each phase. To achieve this, the constraint $$kT_s \leq t_{p1} \leq t_{p2} \leq \ldots \leq t_{pn_{pk}} \leq (k+1)T_s \quad (51)$$

is imposed on the modified switching instants. This is done for each phase separately. Between the phases, no constraint is imposed.

Let $v_p(k)$ denote the modified averaged switch position in phase p and in the kth sampling interval. This variable is manipulated by the controller within the bounds $$\underline{v}_p(k) \leq v_p(k) \leq \overline{v}_p(k), \quad (52)$$

where $\underline{v}_p(k)$ is the lower bound on the manipulated variable $v_p(k)$, and $\overline{v}_p(k)$ is its upper bound. To derive these bounds, it is noted that the minimum (maximum) value of the continuous-time switching signal $u^*_p(t)$ with $t \in [kT_s,(k+1)T_s]$ is given by the lowest (highest) switch position in that sampling interval. The lower and upper bound follow as $$\underline{v}_p(k) = \min_{t \in [kT_s,(k+1)T_s]} u^*_p(t) \text{ and } \overline{v}_p(k) = \max_{t \in [kT_s,(k+1)T_s]} u^*_p(t). \quad (53)$$

These definitions hold true independent of the number of switching transitions in that sampling interval.

In sampling intervals in which no switching transition occurs, i.e., for which $n_{pk}=0$, the averaged single-phase switch position remains equal to the nominal switching signal $u^*_p(t)$ at the kth sampling instant, i.e., $$v_p(k)=u^*_p(kT_s). \quad (54)$$

With the above described constraints, the switching instants cannot be moved out of their respective sampling interval, see (51). This implies that the lower and upper constraints on the averaged switch positions are determined by the minimum and maximum switch position that can be synthesized in that sampling interval.

To relax the restriction imposed by the sampling interval, the bounds may be relaxed by a given $\Delta v_{p,max}$ such that the switching instants are allowed to be moved beyond their corresponding sampling intervals.

Alternatively, the sampling interval restrictions can be fully removed. Consider phase p, with $p \in \{a,b,c\}$, and consider its $n_p$ switching transitions within the prediction horizon. The constraint (51) is then generalized to the whole prediction horizon interval, i.e., $$kT_s \leq t_{p1} \leq t_{p2} \leq \ldots \leq t_{pn_p} \leq (k+N)T_s. \quad (55)$$

The lower constraint at $kT_s$ ensures that switching instants are not moved into the past. The upper constraint at $(k+N)T_s$ limits the last switching instant $t_{pn_p}$ to the prediction horizon interval. The constraints in (55) can be translated into equivalent constraints on the averaged switch positions in the discrete-time domain, $v_p(\ell)$, with $\ell \in \{k, k+1, \ldots, k+N\}$. These constraints may be added for each phase p. A coupling constraint between the three phases may not be required.

Optimization Stage (Block 44)

In block 44, the method achieves trajectory tracking by modifying the sequence of averaged switch positions such that the predicted tracking error within the prediction horizon is minimized at the sampling instants. The required inputs are the measured (or estimated) state vector $x_{\alpha\beta}(k)$, the reference trajectory $Y^*_{\alpha\beta}(k)$, the sequence of nominal averaged switch positions $V^*_{abc}(k)$, and the discrete-time system model (5). The latter is used to predict the tracking error at each sampling instant within the prediction horizon. The controller manipulates the sequence of averaged switch positions $V_{abc}(k)$ defined in (50).

Cost Function

The cost function of the optimization problem may be defined as $$J(V_{abc}(k))=\Sigma_{\ell=k}^{k+N-1}\|y^*_{\alpha\beta}(\ell+1)-y_{\alpha\beta}(\ell+1)\|_Q^2 + \lambda_v\|v^*_{abc}(\ell)-v_{abc}(\ell)\|_2^2. \quad (56)$$

The cost function is a function of the sequence of averaged switch positions over the prediction horizon, $V_{abc}(k)$. The tracking error $y^*_{\alpha\beta}(\ell+1)-y_{\alpha\beta}(\ell+1)$ is the difference between the optimal steady-state reference trajectory, computed in (39), and the output predictions, which are obtained from the discrete-time system model (5) using $V_{abc}(k)$ as input. The positive definite penalty matrix Q adjusts the weight on the tracking error for each output variable. Note that $\|\xi\|_Q^2=\xi^T Q\xi$.

The control effort corresponds to the degree with which the averaged switch positions are corrected. It may be defined as the 2-norm of the difference $v^*_{abc}(\ell)-v_{abc}(\ell)$ between the nominal and the modified averaged switch positions. The control effort is penalized with the scalar weight $\lambda_v>0$.

Constraints

The constraints on the averaged switch position (52) may be derived for each phase and sampling interval by Algorithm 1.

Algorithm 1 Averaged switch position constraint
1:   for $p \in \{a, b, c\}$ do
2:     for $\ell = k$ to $k + N − 1$ do
3:       if $\exists i$ such that $\ell T_s \leq t_{pi} \leq (\ell + 1)T_s$, $i \in \{1, \ldots, n_p\}$ then
4:         $v_p(\ell) = u_p^*(\ell T_s)$
5:       else
          i. $\underline{v}_p(\ell) \leq v_p(\ell) \leq \overline{v}_p(\ell)$ with $$\underline{v}_p(\ell) = \min_{t \in [\ell T_s,(\ell+1)T_s]} u_p^*(t)$$

6:         and $\quad \overline{v}_p(\ell) = \max_{t \in [\ell T_s,(\ell+1)T_s]} u_p^*(t)$ 7:       end if
8:     end for
9:   end for The upper bounds on the averaged switch positions are aggregated in $$\overline{V}_{abc}(k)=[\overline{v}_a(k)\overline{v}_b(k)\overline{v}_c(k) \ldots \overline{v}_a(k+N-1)\overline{v}_b(k+n-1) \overline{v}_c(k+N-1)]^T. \quad (57)$$

The lower bounds are aggregated accordingly in the vector $\underline{V}_{abc}(k)$. This gives the general formulation for the constraints $$GV_{abc}(k) \leq g, \quad (58)$$

with $$G = \begin{bmatrix} I_{3N} \\ -I_{3N} \end{bmatrix} \text{ and } g = \begin{bmatrix} \overline{V}_{abc}(k) \\ -\underline{V}_{abc}(k) \end{bmatrix}. \quad (59)$$

Note that $I_{3N}$ denotes the identity matrix of the size $3N \times 3N$.

One of the main benefits of MPC is its ability to impose constraints on state, input and output variables. It may be beneficial to impose constraints on the output (or controlled) variables to limit overshoots during transients and faults. By limiting the converter current and capacitor voltage to their safe operating area with the help of output constraints, damage to the converter and its passive components can be avoided.

Based on the current state vector $x_{\alpha\beta}(k)$ and the sequence of future manipulated variables $V_{abc}(k)$, the future output variables $Y_{\alpha\beta}(k)$ can be predicted. It is straightforward to impose upper and lower constraints on these output variables. To ensure that a solution to the quadratic program always exists, i.e. that a sequence of manipulated variables $V_{abc}(k)$ can be computed for the given state vector and OPP in all circumstances, it is advisable to impose the constraints on the output variables as soft constraints. These introduce slack variables in the inequality constraints, which are heavily penalized in an additional term in the objective function. In doing so, (slight) violations of the output constraints are possible, albeit at the expense of a huge penalty in the objective function.

Quadratic Program

The cost function J in (56), the inequality constraints (58) and the discrete-time system model (5) form the basis to formulate the optimization problem underlying the present method. The following optimization problem can be formulated $$V_{abc}(k) = \quad (60)$$

$$\arg \min_{V_{abc}(k)} \sum_{\ell=k}^{k+N-1} \left\| y_{\alpha\beta}^*(\ell+1) - y_{\alpha\beta}(\ell+1) \right\|_Q^2 + \lambda_v \| v_{abc}^*(\ell) - v_{abc}(\ell) \|_2^2$$

subject to $x_{\alpha\beta}(\ell+1) = Ax_{\alpha\beta}(\ell) + Bv_{abc}(\ell)$ i. $y_{\alpha\beta}(\ell+1) = Cx_{\alpha\beta}(\ell+1) \forall \ell = k, \ldots, k+N-1$ ii. $GV_{abc}(k) \leq g$.

To solve this problem, it can be reformulated in the conventional quadratic program (QP) form.

The sequence of predicted output variables over the prediction horizon computed at the current sampling instant $kT_s$ is $$Y_{\alpha\beta}(k) = [y_{\alpha\beta}^T(k+1) \, y_{\alpha\beta}^T(k+2) \ldots y_{\alpha\beta}^T(k+N)]^T, \quad (61)$$

which can be derived as a function of the current state vector and the sequence of modified averaged switch positions by recursively inserting (5). This leads to $$Y_{\alpha\beta}(k) = \begin{bmatrix} CA \\ CA^2 \\ \vdots \\ CA^N \end{bmatrix} x_{\alpha\beta}(k) + \begin{bmatrix} CB & 0_{6\times3} & \ldots & 0_{6\times3} \\ CAB & CB & \ldots & 0_{6\times3} \\ \vdots & \vdots & \ddots & \vdots \\ CA^{N-1}B & CA^{N-2}B & \ldots & CB \end{bmatrix} V_{abc}(k)$$

$$= \Gamma x_{\alpha\beta}(k) + \Upsilon V_{abc}(k).$$

Recall that $V_{abc}(k)$ is the sequence of modified averaged switch positions defined in (50). Define the penalty matrix a. $\tilde{Q} = \text{diag}(Q, Q, \ldots, Q)$, where $\tilde{Q} \in \mathbb{R}^{6N \times 6N}$. With this definition and with (62), the cost function (56) can be rewritten as $$J = (Y^*_{\alpha\beta}(k) - \Gamma x_{\alpha\beta}(k) - \Upsilon V_{abc}(k))^T \tilde{Q} (Y^*_{\alpha\beta}(k) - \Gamma x_{\alpha\beta}(k) - \Upsilon V_{abc}(k)) + \lambda_v (V^*_{abc}(k) - V_{abc}(k))^T (V^*_{abc}(k) - V_{abc}(k)). \quad (63)$$

In the end, the cost function is $$J = \tfrac{1}{2} V_{abc}^T(k) H V_{abc}(k) + \Theta^T(k) V_{abc}(k) + \theta(k), \quad (64)$$

with i. $H = 2[Y^T \tilde{Q} Y + \lambda_v I_{3N}]$ (65)

ii. $\Theta(k) = 2[Y^T \tilde{Q} (\Gamma x_{\alpha\beta}(k) - Y^*_{\alpha\beta}(k)) - \lambda_v V^*_{abc}(k)]$ (66)

iii. $\theta(k) = \|Y^*_{\alpha\beta}(k) - \Gamma x_{\alpha\beta}(k)\|_{\tilde{Q}}^2 + \lambda_v \|V^*_{abc}(k)\|_2^2$. (67)

Note that the term $\theta(k)$ remains constant during the optimization and can thus be neglected in the cost function.

In summary, the quadratic program (QP)

$$V_{abc}(k) = \arg \min_{V_{abc}(k)} \frac{1}{2} V_{abc}^T(k) H V_{abc}(k) + \Theta^T(k) V_{abc}(k) \quad (68)$$

subject to $GV_{abc}(k) \leq g$ results, where the Hessian matrix H and the parameter vector $\Theta(k)$ are defined in (65) and (66), respectively. By solving the QP at time step k, the sequence of optimal averaged three-phase switch positions over the prediction horizon, $V_{abc}(k)$, is obtained.

By subtracting the sequence of nominal averaged switch positions, the sequence of optimal averaged switch position modifications $$\Delta V_{abc}(k) = V_{abc}(k) - V^*_{abc}(k) = [\Delta v_{abc}^T(k) \Delta v_{abc}^T(k+1) \ldots \Delta v_{abc}^T(k+N-1)]^T$$

results. These modifications are proportional to volt-second modifications, which are to be applied in each sampling interval in the prediction horizon and for each phase.

Lower Dimensional Quadratic Program

The proposed control method may be extended in various ways. The optimization vector of the QP, $V_{abc}(k)$, is of the dimension 3N, owing to the three phases and the prediction horizon N. The time required to solve the QP strongly depends on the dimension of $V_{abc}(k)$. To speed up the computations, the problem dimension can be easily reduced. Recall that the controller 20 may only be allowed to modify the averaged switch position in sampling intervals in which at least one switching transition occurs. Conversely, in this case, the averaged switch position cannot be manipulated in sampling intervals without a switching transition; the averaged switch position in these sampling intervals is, thus, fixed, and can be removed as a degree of freedom. This means that the dimension of the optimization vector can be reduced accordingly. However, the Hessian matrix then becomes a time-varying matrix.

Switching Instants as Decision Variables

In an alternative problem formulation, the switching instant modifications of the switching transitions $\Delta t_{pi}$ may be used as decision variables. As before, the averaged switch positions $v_p(k)$ are used as input to the discrete-time system model (5). However, the sequence of averaged switch positions $V_{abc}(k)$, see (50), is considered now an auxiliary variable, not the decision variable. The averaged switch positions are obtained from the nominal averaged switch positions $v^*_p(k)$ (46) and the averaged switch position modifications $\Delta v_p(k)$ according to $$v_p(k) = v^*_p(k) + \Delta v_p(k). \tag{69}$$

At each time step $\ell \in \{k, k+1, \ldots, k+N\}$ within the prediction horizon and for each phase p, with $p \in a, b, c$, equality constraints of the form $$\Delta v_p(\ell) = -\sum_{i=1}^{n_{pk}} \frac{\Delta t_{pi}}{T_s} \Delta u^*_i \tag{70}$$

are imposed. These equality constraints are of the same form as those in (78, see below).

The switching instant modifications in the three phases within the prediction horizon are aggregated in the vector $$\Delta T = [\Delta t_{a1} \; \Delta t_{a2} \ldots \Delta t_{an_a} \; \Delta t_{b1} \; \Delta t_{b2} \ldots \Delta t_{bn_b} \; \Delta t_{c1} \; \Delta t_{c2} \ldots \Delta t_{cn_c}]^T. \tag{71}$$

The following QP can be derived: The cost function is the same as in (68). Additional equality constraints of the form (70) are added. The constraints (55) are added as inequality constraints with the help of $t_{pi} = t^*_{pi} + \Delta t_{pi}$. The decision variable, over which the QP is solved, is the vector $\Delta T$ as defined in (71).

Back Transformation (Blocks 46, 48 and 50)

The sequence of averaged switch position modifications $\Delta V_{abc}(k)$ in the discrete-time domain may be translated back into switching instant modifications $$\Delta t_{abc} = [\Delta t_{a1} \; \Delta t_{a2} \ldots \Delta t_{an_a} \; \Delta t_{b1} \ldots \Delta t_{bn_b} \; \Delta t_{c1} \; \Delta t_{cn_c}]^T \tag{72}$$

in the continuous-time domain. This may be done separately for each phase and for each sampling interval within the prediction horizon. Let $\Delta v_p(k)$ denote the averaged switch position modification in the kth sampling interval and in phase p, in which $n_{pk}$ switching transitions occur. The averaged switch position modification $\Delta v_p(k)$ must be equal to the $n_{pk}$ switching instant modifications $\Delta t_{pi}$, with $p \in \{a, b, c\}$ and $i \in \{1, 2, \ldots, n_{pk}\}$ in that sampling interval and phase.

Consider the single-phase averaged switch position modification in the kth sampling interval $$\Delta v_p(k) = v_p(k) - v^*_p(k), \tag{73}$$

where $v_p(k)$ is the modified averaged switch position in the kth sampling interval. Recall that $n_{pk}$ denotes the number of nominal switching transitions in the kth sampling interval, and that the sampling interval limits are renamed according to (43). In (73), $v^*_p(k)$ is substituted with (44); $v_p(k)$ can be replaced by an equivalent equation without the superscript *. This results in $$\Delta v_p(k) = \sum_{i=0}^{n_{pk}} \frac{t_{p,i+1} - t_{pi}}{T_s} u^*_{pi} - \sum_{i=0}^{n_{pk}} \frac{t^*_{p,i+1} - t^*_{pi}}{T_s} u^*_{pi} = \tag{74}$$

$$\sum_{i=0}^{n_{pk}} \frac{t_{p,i+1} - t^*_{p,i+1}}{T_s} u^*_{pi} - \sum_{i=0}^{n_{pk}} \frac{t_{pi} - t^*_{pi}}{T_s} u^*_{pi}.$$

Note that according to (43) the first and last switching instants for the modified and nominal averaged switch positions are equal, as they correspond to the sampling interval limits $$t_{p0} = t^*_{p0} = kT_s \text{ and } t_{p,n_{pk}+1} = t^*_{p,n_{pk}+1} = (k+1)T_s. \tag{75}$$

Furthermore, the ith switching instant modification in phase p is defined $$\Delta t_{pi} = t_{pi} - t^*_{pi} \tag{76}$$

as the difference between the modified switching instant $t_{pi}$ and the nominal switching instant $t^*_{pi}$. With (75) and (76), the sums in (74) reduce to $$\Delta v_p(k) = \sum_{i=0}^{n_{pk}-1} \frac{\Delta t_{p,i+1}}{T_s} u^*_{pi} - \sum_{i=1}^{n_{pk}} \frac{\Delta t_{pi}}{T_s} u^*_{pi} \tag{77}$$

$$\Delta v_p(k) = \sum_{i=1}^{n_{pk}} \frac{\Delta t_{pi}}{T_s} u^*_{p,i-1} - \frac{\Delta t_{pi}}{T_s} u^*_{pi} = \sum_{i=1}^{n_{pk}} \frac{\Delta t_{pi}}{T_s} (u^*_{p,i-1} - u^*_{pi}).$$

With the definition of the switching transition $\Delta u^*_{pi}$ in (14), (77) simplifies to $$\Delta v_p(k) = -\sum_{i=1}^{n_{pk}} \frac{\Delta t_{pi}}{T_s} \Delta u^*_{pi}. \tag{78}$$

Thus, the relationship $$\Delta v_p(k) T_s = -\sum_{i=1}^{n_{pk}} \Delta t_{pi} \Delta u^*_{pi} \tag{79}$$

preserves the volt-second modification in the kth sampling interval.

To compute the switching instant modifications, the linear optimization problem $$[\Delta t_{p1} \ldots \Delta t_{pn_{pk}}]^T = \arg\min_{[\Delta t_{p1} \ldots \Delta t_{pn_{pk}}]^T} \sum_{i=1}^{n_{pk}} |\Delta t_{pi}| \tag{80a}$$

$$\text{subject to } \Delta v_p(k) = -\sum_{i=1}^{n_{pk}} \frac{\Delta t_{pi}}{T_s} \Delta u^*_{pi} \tag{80b}$$

$$kT_s \leq t^*_{p1} + \Delta t_{p1} \leq \ldots \leq t^*_{pn_{pk}} + \Delta t_{pn_{pk}} \leq (k+1)T_s, \tag{80c}$$

may be solved, which is a so-called linear program (LP). The objective is to modify the switching instants as little as possible. This may be achieved by penalizing the switching instant modifications with the l-norm. Recall the constraint (51) on the modified switching transitions, which ensures that the order of the switching transitions is kept and that the switching instants are restricted to the sampling interval. With the help of $t_{pi} = t^*_{pi} + \Delta t_{pi}$, the constraint (80c) directly follows.

Solving the LP results in the vector of switching instant modifications $[\Delta t_{p1} \, \Delta t_{p2} \ldots \Delta t_{pn_{pk}}]^T$.

Receding Horizon Policy

Figure 11A:
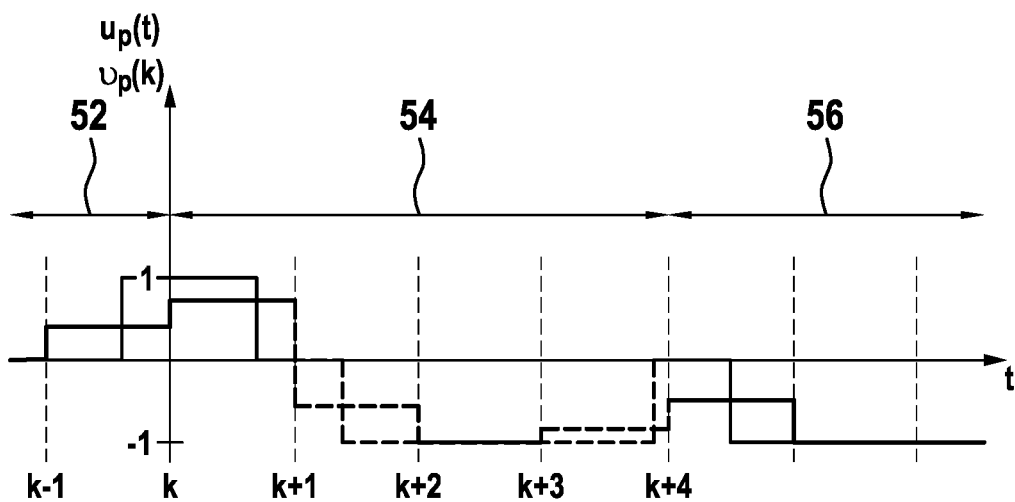
FIGS. 11a and 11b show switching signals and averaged switch positions used during the method performed by the controller of FIGS. 4 to 6.
Figure 11B:
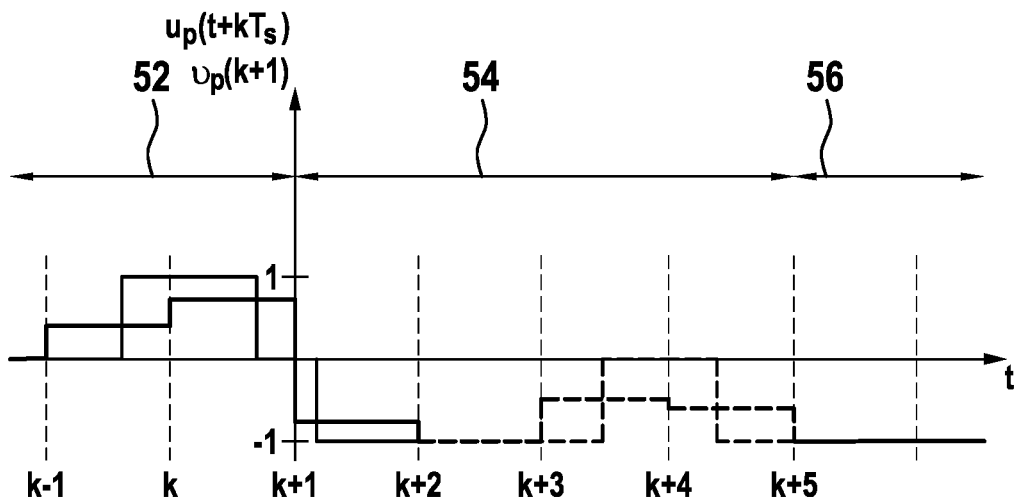

The controller 20 may operate in a receding horizon fashion, as illustrated for the single-phase case in FIGS. 11*a* and 11*b*. FIG. 11*a* shows the modified switching signal $u_p$ in the continuous-time domain and the modified averaged switch positions $v_p$ in the discrete-time domain at time step $kT_s$; FIG. 11*b* shows these signals at time step $(k+1)T_s$. Both figures show the past 52, the prediction horizon 54 and the nominal OPP beyond the horizon 56.

At time instant $kT_s$, the controller determines the sequence of optimal averaged switch positions over the prediction horizon of N steps $V_p(k)=[v_p(k) \, v_p(k+1) \ldots v_p(k+N-1)]^T$, see FIG. 11*a*. This sequence of averaged switch positions is translated from the discrete-time domain to the modified switching signal in the continuous-time domain. Of this, only the switching signal for the current sampling interval, i.e. until the next sampling instant, may be applied to the converter system 10, i.e. $u_p(t)$ with $t \in [kT_s, (k+1)T_s]$.

At the next sampling instant $(k+1)T_s$, the controller 20 receives new reference values and a new state vector. Based on these, a new optimization problem is formulated and solved. The solution to this problem is the sequence of modified averaged switch positions $V_p(k+1)$, see FIG. 11*b*. $V_p(k+1)$ may differ significantly from $[v_p(k+1) \, v_p(k+2) \ldots v_p(k+N-2)]^T$ computed at the previous sampling instant; this may be the case particularly during large disturbances and transients.

In general, the receding horizon policy may provide feedback and a high degree of robustness in the presence of unmodeled disturbances and inaccuracies in the model.

Symbols t Time, $t \in \mathbb{R}^+$
k Discrete time step, $k \in \mathbb{N}$
$\ell$ Discrete time step within the prediction horizon, $\ell \in \{k, k+1, \ldots, k+N\}$
d Pulse number, $d \in \mathbb{N}$
m Modulation index, $m \in [0, 4/\pi]$
$\alpha^*_i$ Nominal ith switching angle, $\alpha^*_i \in [0, 2\pi]$
$u^*_i$ Nominal ith single-phase switch position, e.g., $u^*_i \in \{-1, 0, 1\}$
$\Delta u^*_i$ Nominal ith switching transition, $\Delta u^*_i \in \{-1, 1\}$
$u^*_{abc}(t)$ Three-phase nominal switching signal in continuous-time, e.g. $u^*_{abc} \in \{-1, 0, 1\}^3$
$v_{g,\alpha\beta}(t)$ Grid voltage in stationary orthogonal $\alpha\beta$ coordinates
$i_{g,\alpha\beta}(t)$ Grid current in stationary orthogonal $\alpha\beta$ coordinates
$v_{cap,\alpha\beta}(t)$ Capacitor voltage in stationary orthogonal $\alpha\beta$ coordinates
$v_{c,\alpha\beta}(t)$ Converter voltage in stationary orthogonal $\alpha\beta$ coordinates
$i_{c,\alpha\beta}(t)$ Converter current in stationary orthogonal $\alpha\beta$ coordinates
$x_{\alpha\beta}(t)$ State variable in stationary orthogonal $\alpha\beta$ coordinates
$y_{\alpha\beta}(t)$ Output variable in stationary orthogonal $\alpha\beta$ coordinates
F, $\tilde{F}$ System matrices in the continuous-time domain
G, $\tilde{G}_1$, $\tilde{G}_2$ Input matrices in the continuous-time domain
A, $\tilde{A}_i$ System matrices in the discrete-time domain
B, $\tilde{B}_i$ Input matrices in the discrete-time domain
C Output matrix in the continuous-time and discrete-time domain
$\omega_g$ Fundamental angular grid frequency
$\theta_g$ Grid voltage phase angle
N Prediction horizon, $N \in \mathbb{N}$
$\theta^*_1$ Sampling angles for the reference trajectory computation based on the converter voltage, $\theta^*_1 \in [0, 2\pi]$
$Y^*_{1conv,\alpha\beta}(\theta)$ Reference trajectory based on the converter voltage sampled at $\theta^*_1$ over one fundamental period in stationary orthogonal $\alpha\beta$ coordinates
$Y^*_{conv,\alpha\beta}(k)$ Reference trajectory contribution from the converter voltage over the horizon computed at time instant $kT_s$ in stationary orthogonal $\alpha\beta$ coordinates
$Y^*_{grid,\alpha\beta}(k)$ Reference trajectory contribution from the grid voltage over the horizon computed at time instant $kT_s$ in stationary orthogonal $\alpha\beta$ coordinates
$Y^*_{\alpha\beta}(k)$ Reference trajectory for the controller over the horizon computed at time instant $kT_s$ in stationary orthogonal $\alpha\beta$ coordinates
$t_{pi}$ Modified ith switching instant in phase p, $t_{pi} \in \mathbb{R}$
$\Delta t_{pi}$ Switching instant correction in phase p for the ith switching transition, $\Delta t_{pi} \in \mathbb{R}$
$T_s$ Sampling interval, $T_s \in \mathbb{R}^+$
$n_p$ Number of switching transitions in phase p occurring within the prediction horizon, $n_p \in \mathbb{N}$
$n_{pk}$ Number of switching transitions in phase p in the kth sampling interval, $n_{pk} \in \mathbb{N}$
$v_{abc}(k)$ Three-phase modified averaged switch position in the kth sampling interval, $v_{abc} \in [-1, 1]^3$
$V^*_{abc}(k)$ Sequence of nominal three-phase averaged switch positions over the horizon starting at the kth sampling interval, $V^*_{abc} \in [-1, 1]^{3N}$
$V_{abc}(k)$ Sequence of modified (or optimized) three-phase averaged switch positions over the horizon starting at the kth sampling interval, $V_{abc} \in [-1, 1]^{3N}$
$\Delta v_p(k)$ Correction of the averaged switch position in phase p in the kth sampling interval, $\Delta v_p \in \mathbb{R}$
$\Delta V_{abc}(k)$ Sequence of three-phase averaged switch position modifications over the horizon starting at the kth sampling interval, $\Delta V_{abc} \in \mathbb{R}^{3N}$
H Hessian matrix in the QP Variables z(t) Scalar quantity in the continuous-time domain
z(k) Scalar quantity in the discrete-time domain
z Column vector referring to, e.g., a three-phase quantity
Z Column vector referring to a sequence of scalar or vector quantities over multiple time instants, or a matrix Superscripts i*, u* Current reference or nominal switching signal
$\tilde{x}$ State vector of reduced dimension
$z^T$ Row vector
$\hat{u}_n$ Amplitude of nth switching signal harmonic Abbreviations dc Direct current
LP Linear program
MPC Model predictive control
MP³C Model predictive pulse pattern control
MP³C⁺ Generalized model predictive pulse pattern control NPC Neutral-point-clamped
OPP Optimized pulse pattern
PCC Point of common coupling
QP Quadratic program
rms Root-mean-square
TDD Total demand distortion While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art and practising the claimed disclosure, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for controlling an electrical converter system, the method comprising:
   determining a switching signal and a reference trajectory of at least one electrical quantity of the electrical converter system over a horizon of future sampling instants, wherein the switching signal and the reference trajectory are determined from a table of optimized pulse patterns, and wherein the switching signal comprises switching transitions between output levels of an electrical converter of the electrical converter system and the reference trajectory indicates a desired future trajectory of the at least one electrical quantity of the converter system;
   generating a sequence of averaged switch positions from the switching signal over the horizon, wherein the switching signal is divided into sampling intervals, wherein the sequence of averaged switch positions comprises an averaged switch position per sampling interval, and wherein the averaged switch position is determined by averaging the switching signal defined by the switching instants and output levels in the sampling interval;
   determining a sequence of optimized averaged switch positions by optimizing a cost function based on the sequence of averaged switch positions, wherein the cost function comprises an error term with a difference of the reference trajectory and a predicted trajectory, wherein the cost function additionally comprises a term with a difference of the averaged switch positions and the optimized averaged switch positions, and wherein the predicted trajectory is determined over the horizon from a model of the converter system, into which a sequence of modified averaged switch positions and measurements of the converter system are input;
   determining an optimized switching signal for a current sampling interval by moving switching transitions in the switching signal, such that in the current sampling interval the average of the switching signal with the modified switching transitions equals the optimized averaged switch position; and
   applying at least the next switching transition of the optimized switching signal for the current sampling interval to the electrical converter system.

2. The method of claim 1,
   wherein sampling intervals without switching transitions are discarded from the sequence of averaged switch positions, and wherein the averaged switch positions are solely optimized in the sampling intervals comprising switching transitions.

3. The method of claim 1,
   wherein the sequence of optimized averaged switch positions is determined by solving a quadratic program into which the averaged switch positions, the reference trajectory, and the predicted trajectory are input.

4. The method of claim 1,
   wherein the sequence of optimized averaged switch positions is determined by optimizing the cost function subject to constraints; and
   wherein the averaged switch positions are constrained, such that the modified switching transitions stay within the respective sampling interval.

5. The method of claim 1,
   wherein the sequence of optimized averaged switch positions is determined by optimizing the cost function subject to constraints; and
   wherein the averaged switch positions are constrained, such that the modified switching transitions stay in the original order.

6. The method of claim 1,
   wherein the reference trajectory has a converter contribution, which is determined from the optimized pulse patterns;
   wherein the reference trajectory has a grid contribution, which is determined from an estimated sinusoidal grid voltage; and
   wherein the reference trajectory is the sum of the converter contribution and the grid contribution.

7. The method of claim 1,
   wherein the converter contribution to the reference trajectory is determined at support points with a different spacing as the controller sampling instants, and values of the reference trajectory at the sampling instants are determined by interpolation.

8. The method of claim 1,
   wherein the optimized pulse patterns and a converter contribution of the reference trajectory are determined offline and stored in a lookup table.

9. The method of claim 1,
   wherein the modified switching transitions of the optimized switching signal are determined by solving a linear program with a further cost function, which minimizes the differences of the unmodified switching transitions and the respective modified switching transitions.

10. A computer for controlling an electrical converter system, the computer comprising at least one processor, the at least one processor programmed to:
    determine a switching signal and a reference trajectory of at least one electrical quantity of the electrical converter system over a horizon of future sampling instants, wherein the switching signal and the reference trajectory are determined from a table of optimized pulse patterns, and wherein the switching signal comprises switching transitions between output levels of an electrical converter of the electrical converter system and the reference trajectory indicates a desired future trajectory of the at least one electrical quantity of the converter system;
    generate a sequence of averaged switch positions from the switching signal over the horizon, wherein the switching signal is divided into sampling intervals, wherein the sequence of averaged switch positions comprises an averaged switch position per sampling interval, and wherein the averaged switch position is determined by averaging the switching signal defined by the switching instants and output levels in the sampling interval;

determine a sequence of optimized averaged switch positions by optimizing a cost function based on the sequence of averaged switch positions, wherein the cost function comprises an error term with a difference of the reference trajectory and a predicted trajectory, wherein the cost function additionally comprises a term with a difference of the averaged switch positions and the optimized averaged switch positions, and wherein the predicted trajectory is determined over the horizon from a model of the converter system, into which a sequence of modified averaged switch positions and measurements of the converter system are input;

determine an optimized switching signal for a current sampling interval by moving switching transitions in the switching signal, such that in the current sampling interval the average of the switching signal with the modified switching transitions equals the optimized averaged switch position; and apply at least the next switching transition of the optimized switching signal for the current sampling interval to the electrical converter system.

11. A non-transitory computer-readable medium, in which a computer program according to claim 10 is stored.

12. A controller for an electrical converter system, the controller programmed to:

determine a switching signal and a reference trajectory of at least one electrical quantity of an electrical converter system over a horizon of future sampling instants, wherein the switching signal and the reference trajectory are determined from a table of optimized pulse patterns, and wherein the switching signal comprises switching transitions between output levels of an electrical converter of the electrical converter system and the reference trajectory indicates a desired future trajectory of the at least one electrical quantity of the converter system;

generate a sequence of averaged switch positions from the switching signal over the horizon, wherein the switching signal is divided into sampling intervals, wherein the sequence of averaged switch positions comprises an averaged switch position per sampling interval, and wherein the averaged switch position is determined by averaging the switching signal defined by the switching instants and output levels in the sampling interval;

determine a sequence of optimized averaged switch positions by optimizing a cost function based on the sequence of averaged switch positions, wherein the cost function comprises an error term with a difference of the reference trajectory and a predicted trajectory, wherein the cost function additionally comprises a term with a difference of the averaged switch positions and the optimized averaged switch positions, and wherein the predicted trajectory is determined over the horizon from a model of the converter system, into which a sequence of modified averaged switch positions and measurements of the converter system are input;

determine an optimized switching signal for a current sampling interval by moving switching transitions in the switching signal, such that in the current sampling interval the average of the switching signal with the modified switching transitions equals the optimized averaged switch position; and apply at least the next switching transition of the optimized switching signal for the current sampling interval to the electrical converter system.

13. A converter system, comprising:

an electrical converter interconnected with an electrical grid; and a controller according to claim 12 for controlling the electrical converter.

14. The converter system of claim 13, further comprising:

a resonant subsystem comprising at least an inductor, a filter, and/or a transformer;

wherein the model of the converter system used during optimizing the cost function includes a model of the electrical converter and the resonant subsystem.

* * * * *